(12) United States Patent
Chu et al.

(10) Patent No.: US 10,656,256 B2
(45) Date of Patent: May 19, 2020

(54) RANGING MEASUREMENTS IN WIRELESS COMMUNICATION SYSTEMS

(71) Applicant: Marvell World Trade Ltd., St. Michael (BB)

(72) Inventors: Liwen Chu, San Ramon, CA (US); Sagar Tamhane, Fremont, CA (US); Hongyuan Zhang, Fremont, CA (US); Christian Berger, San Jose, CA (US); Niranjan Grandhe, San Jose, CA (US); Sudhir Srinivasa, Campbell, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 15/947,306

(22) Filed: Apr. 6, 2018

(65) Prior Publication Data
US 2018/0292518 A1  Oct. 11, 2018

Related U.S. Application Data

(60) Provisional application No. 62/483,020, filed on Apr. 7, 2017.

(51) Int. Cl.
*H04W 72/12* (2009.01)
*G01S 11/02* (2010.01)
(Continued)

(52) U.S. Cl.
CPC ............. *G01S 11/02* (2013.01); *G01S 5/0072* (2013.01); *G01S 5/0205* (2013.01); *G01S 5/14* (2013.01);
(Continued)

(58) Field of Classification Search
CPC ..... H04W 24/08; H04W 84/12; H04W 64/00; H04W 56/00; H04W 72/121;
(Continued)

(56) References Cited

U.S. PATENT DOCUMENTS 9,166,660 B2   10/2015  Chu et al.
10,064,077 B2 *  8/2018  Aldana .................... G01S 5/12
(Continued)

FOREIGN PATENT DOCUMENTS

WO   WO-2014/130070 A1   8/2014
WO   WO-2014/137391 A1   9/2014

OTHER PUBLICATIONS

International Search Report and Written Opinion in International Patent Application No. PCT/US2018/026517, dated Jul. 18, 2018 (13 pages).

(Continued)

*Primary Examiner* — Khawar Iqbal

(57) ABSTRACT

During a service period (SP) for a ranging measurement signal exchange between a first communication device and one or more second communication devices, the first communication device receives respective first null data packets (NDPs) from the one or more second communication devices, and transmits respective second NDPs to the one or more second communication devices. The first communication device transmits, during the SP, respective first ranging measurement feedback packets to the one or more second communication devices to allow each of the one or more second communication devices to determine a time-of-flight between the first communication device and the second communication device and/or receives, during the SP, respective second ranging measurement feedback packets from the one or more second communication devices to allow the first communication device to determine respective times-of-flight between the first communication device and the one or more second communication devices.

15 Claims, 15 Drawing Sheets

(51) Int. Cl.
| | |
|---|---|
| *H04W 68/00* | (2009.01) |
| *G01S 5/00* | (2006.01) |
| *H04W 64/00* | (2009.01) |
| *G01S 5/02* | (2010.01) |
| *G01S 13/76* | (2006.01) |
| *G01S 5/14* | (2006.01) |

(52) U.S. Cl.
CPC ............ *G01S 13/765* (2013.01); *H04W 64/00* (2013.01); *H04W 68/005* (2013.01); *H04W 72/121* (2013.01)

(58) Field of Classification Search
CPC ..... H04W 68/005; H04W 24/10; H04W 4/02; H04W 4/029; H04W 88/02; G01S 11/00; G01S 5/0205; G01S 5/14; G01S 13/765; G01S 5/0072; G01S 11/02; G01S 5/02
See application file for complete search history.

(56) References Cited

U.S. PATENT DOCUMENTS

| | | | |
|---|---|---|---|
| 2011/0261708 | A1 | 10/2011 | Grandhi |
| 2012/0257605 | A1* | 10/2012 | Abraham ............. H04B 7/0626 370/338 |
| 2013/0229996 | A1 | 9/2013 | Wang et al. |
| 2014/0003406 | A1 | 1/2014 | Kamath et al. |
| 2014/0301219 | A1* | 10/2014 | Ben-Haim ................ G01S 5/14 370/252 |
| 2015/0131517 | A1 | 5/2015 | Chu et al. |
| 2015/0168536 | A1* | 6/2015 | Banin ................... G01S 5/0205 455/456.2 |
| 2017/0171860 | A1* | 6/2017 | Park .................. H04W 72/0453 |
| 2017/0250831 | A1* | 8/2017 | Aldana ................. H04W 4/029 |
| 2017/0251332 | A1* | 8/2017 | Aldana ................. H04W 4/029 |
| 2017/0251449 | A1* | 8/2017 | Malik ................ H04W 56/0065 |
| 2017/0303154 | A1* | 10/2017 | Merlin .................. H04W 24/10 |
| 2018/0041990 | A1* | 2/2018 | Venkatesan .......... H04B 7/0417 |
| 2018/0159609 | A1* | 6/2018 | Yu .......................... H04L 1/0026 |
| 2018/0310194 | A1* | 10/2018 | Yang ..................... H04W 64/00 |
| 2019/0052484 | A1* | 2/2019 | Lindskog ............. H04W 12/12 |
| 2019/0104531 | A1* | 4/2019 | Kwon ................. H04W 72/121 |
| 2019/0280832 | A1* | 9/2019 | Amizur ................. H04L 5/0091 |
| 2019/0349232 | A1* | 11/2019 | Cariou ............... H04L 27/2613 |
| 2019/0361108 | A1* | 11/2019 | Jiang ..................... G01S 13/765 |

OTHER PUBLICATIONS

Chun et al., "Legacy Support on HEW frame structure," doc: IEEE 11-13/1057r0, *The Institute of Electrical and Electronics Engineers, Inc.*, pp. 1-8 (Sep. 2013).
IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).
IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).
IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).
IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).
IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).
IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).
IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
Kwon et al., "SIG Structure for UL PPDU," IEEE Draft, doc. IEEE 802.11-15/0574r0, vol. 802.11ax, 18 pages (May 11, 2015).
Merlin et al., "Trigger Frame Format," IEEE Draft, doc. IEEE 802.11-15/0877r1, vol. 802.11ax, No. 1, 16 pages (Jul. 13, 2015).
Seok et al., "HEW PPDU Format for Supporting MIMO-OFDMA," IEEE 802.11-14/1210r0, 16 pages, (Sep. 14, 2014).
Stacey, "Specification Framework for TGax," doc. IEEE 802.11-15/0132r12, vol. 802.11ax, No. 12, 38 pages (Dec. 1, 2015).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
International Preliminary Report on Patentability in International Patent Application No. PCT/US2018/026517, dated Oct. 17, 2019 (9 pages).

\* cited by examiner

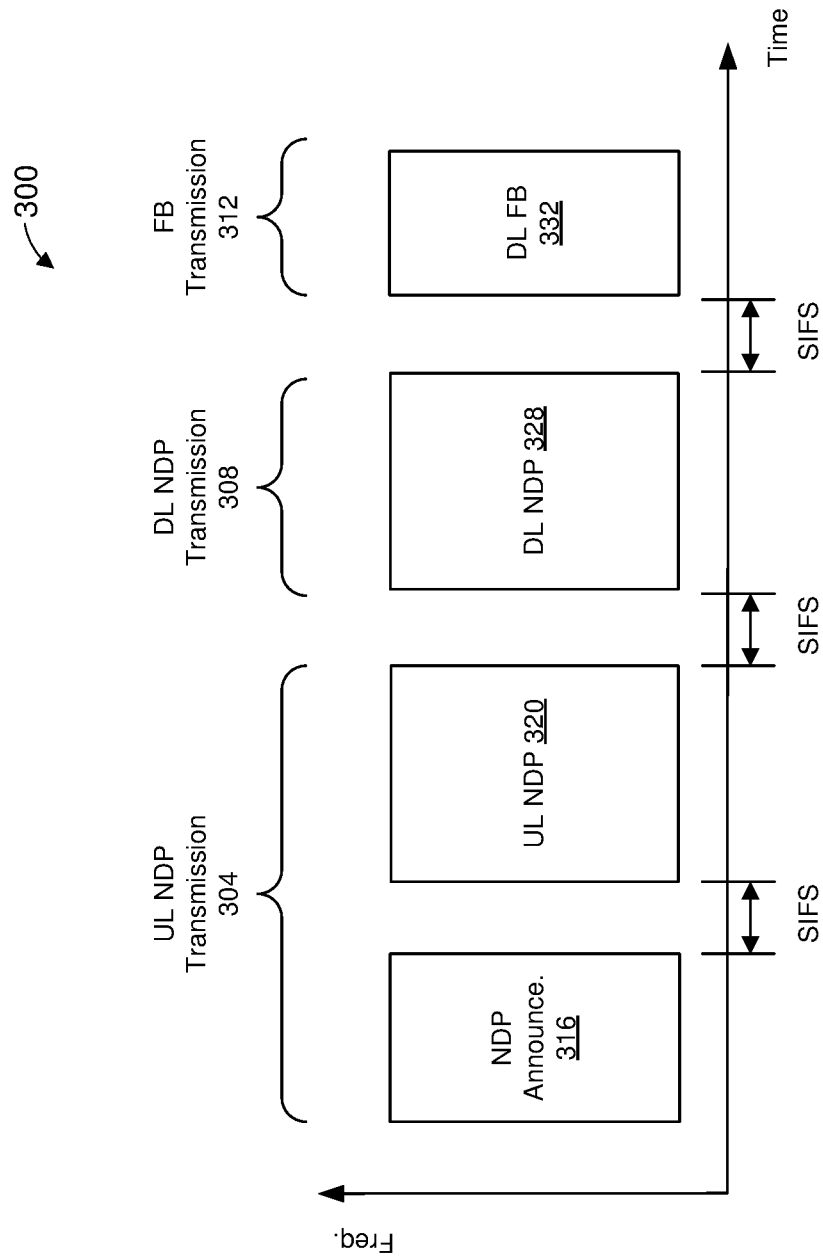

| Ng 452-1 | Nc 452-2 | Codebook Size 452-3 | BW 452-4 | LTF Type 452-5 | LTF Num 452-6 | AoA 452-7 | AoD 452-8 | ToA 452-9 | ToD 452-10 | Measurement Start Time 452-11 | SP Interval 452-12 | SP Duration 452-13 |

Bits:
| 4 | 12 | 1 | 1 | 2 | 2 | 1 | 3 | 1 |
|---|---|---|---|---|---|---|---|---|
| Trigger Type 520-1 | Length 520-2 | Cascade Indication 520-3 | CS Required 520-4 | BW 520-5 | GI And LTF Type 520-6 | MU-MIMO LTF Mode 520-7 | Number of HE-LTF Symbols 520-8 | STBC 520-9 |

Bits:
| 1 | 6 | 3 | 16 | 1 | 9 | 1 | |
|---|---|---|---|---|---|---|---|
| LDPC Extra Symbol 520-10 | AP TX Power 520-11 | Packet Extension 520-12 | Spatial Reuse 520-13 | Doppler 520-14 | HE-SIG-A Reserved 520-15 | Reserved 520-16 | Trigger Dependent Common Info 520-17 |

| Bits: | 12 | 8 | 1 | 1 | 2 | 2 | 1 | 1 | |
|---|---|---|---|---|---|---|---|---|---|
| | AID12 530-1 | RU Allocation 530-2 | Coding Type 530-3 | MCS 530-4 | DCM 530-5 | SS Allocation 530-6 | Target RSSI 530-7 | Reserved 530-8 | Trigger Dependent User Info 530-9 |

Octets:

| Element ID | Length | Element ID Extension | Antenna Info Beacon Count 702 |
|---|---|---|---|
| 1 | 1 | 1 | 1 |

Octets:

| Element ID | Length | Element ID Extension | Antenna Info Beacon TSF 752 |
|---|---|---|---|
| 1 | 1 | 1 | 1 |

RANGING MEASUREMENTS IN WIRELESS COMMUNICATION SYSTEMS

CROSS-REFERENCES TO RELATED APPLICATIONS

This application claims the benefit of U.S. Provisional Patent App. No. 62/483,020, entitled "Null Data Packet (NDP) Negotiation and Measurement Discussion," filed on Apr. 7, 2017, the disclosure of which is hereby expressly incorporated herein by reference in its entirety.

FIELD OF THE DISCLOSURE

The present disclosure relates generally to wireless communication systems, and more particularly to ranging measurements between wireless communication devices.

BACKGROUND

Wireless communication systems, such as wireless local area networks (WLANs), have evolved rapidly over the past decade. For example, the development of WLAN standards such as the Institute for Electrical and Electronics Engineers (IEEE) 802.11 Standard family has improved peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard, now under development, promises to provide even greater throughput, such as throughputs in the tens of Gbps range, in both single-user and multi-user deployments.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building (e.g., an airport, a shopping mall, etc.), within a tunnel, etc.

Techniques for determining a position of a communication device using WLAN technology are now under development. For example, a distance between a first communication and a second communication device is determined by measuring a time of flight of WLAN transmissions between the first communication device and the second communication device. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method for performing ranging measurements in a wireless network comprises receiving, at a first communication device during a service period (SP) for a ranging measurement signal exchange between the first communication device and one or more second communication devices, respective first null data packets (NDPs) from the one or more second communication devices, the respective first NDPs omitting data portions; transmitting, from the first communication device during the SP, respective second NDPs to the one or more second communication devices, the respective second NDPs omitting data portions; and one or both of i) transmitting, from the first communication device during the SP, respective first ranging measurement report packets to the one or more second communication devices, the respective first ranging measurement feedback packet transmitted to a particular second communication device including at least a) an indication corresponding to a time $t_2$ at which the respective first NDP was received from the particular second communication device and b) an indication corresponding to a time $t_3$ at which the respective second NDP was transmitted to the particular second communication device to allow the particular second communication device to determine a time-of-flight between the first communication device and the particular second communication device, and ii) receiving, at the first communication device during the SP, respective second ranging measurement report packets from the one or more second communication devices, the respective second ranging measurement report packet from a particular second communication device including at least a) an indication corresponding to a time $t_1$ at which the respective first NDP was transmitted by the particular second communication device, and b) an indication corresponding to a time $t_4$ at which the respective second NDP was received by the particular second communication device to allow the first communication device to determine a time-of-flight between the first communication device and the particular second communication device.

In another embodiment, an apparatus comprises a network interface device associated with a first communication device. The network interface device includes one or more integrated circuits (ICs) configured to: receive, during a service period (SP) for a ranging measurement signal exchange between the first communication device and one or more second communication devices, respective first null data packets (NDPs) from respective one or more second communication devices; transmit, during the SP, respective second NDPs to the respective one or more second communication devices; and one or both of i) transmit, during the SP, respective first ranging measurement report packets to the one or more second communication devices, the respective first ranging measurement feedback packet transmitted to a particular second communication device including at least a) an indication corresponding to a time $t_2$ at which the respective first NDP was received from the particular second communication device and b) an indication corresponding to a time $t_3$ at which the respective second NDP was transmitted to the particular second communication device to allow the particular second communication device to determine a time-of-flight between the first communication device and the particular second communication device, and ii) receive, during the SP, respective second ranging measurement feedback packets from the one or more second communication devices, the respective second ranging measurement feedback packet from a particular second communication device including at least a) an indication corresponding to a time $t_1$ at which the respective first NDP was transmitted by the particular second communication device, and b) an indication corresponding to a time $t_4$ at which the respective second NDP was received by the particular second communication device to allow the first communication device to determine a time-of-flight between the first communication device and the particular second communication device.

BRIEF DESCRIPTION OF THE DRAWINGS

FIG. 3A is a diagram of an example single-user (SU) ranging measurement exchange in a SU ranging measurement procedure, according to an embodiment;

FIG. 4B is a block diagram of a ranging measurement parameters element used to negotiate parameters for the ranging measurement procedure of FIG. 4A, according to an embodiment;

FIG. 5B is a block diagram of a common information field included in the trigger frame of FIG. 5A, according to an embodiment;

FIG. 5C is a block diagram of a user information field included in the trigger frame of FIG. 5A, according to an embodiment;

Figure 1:
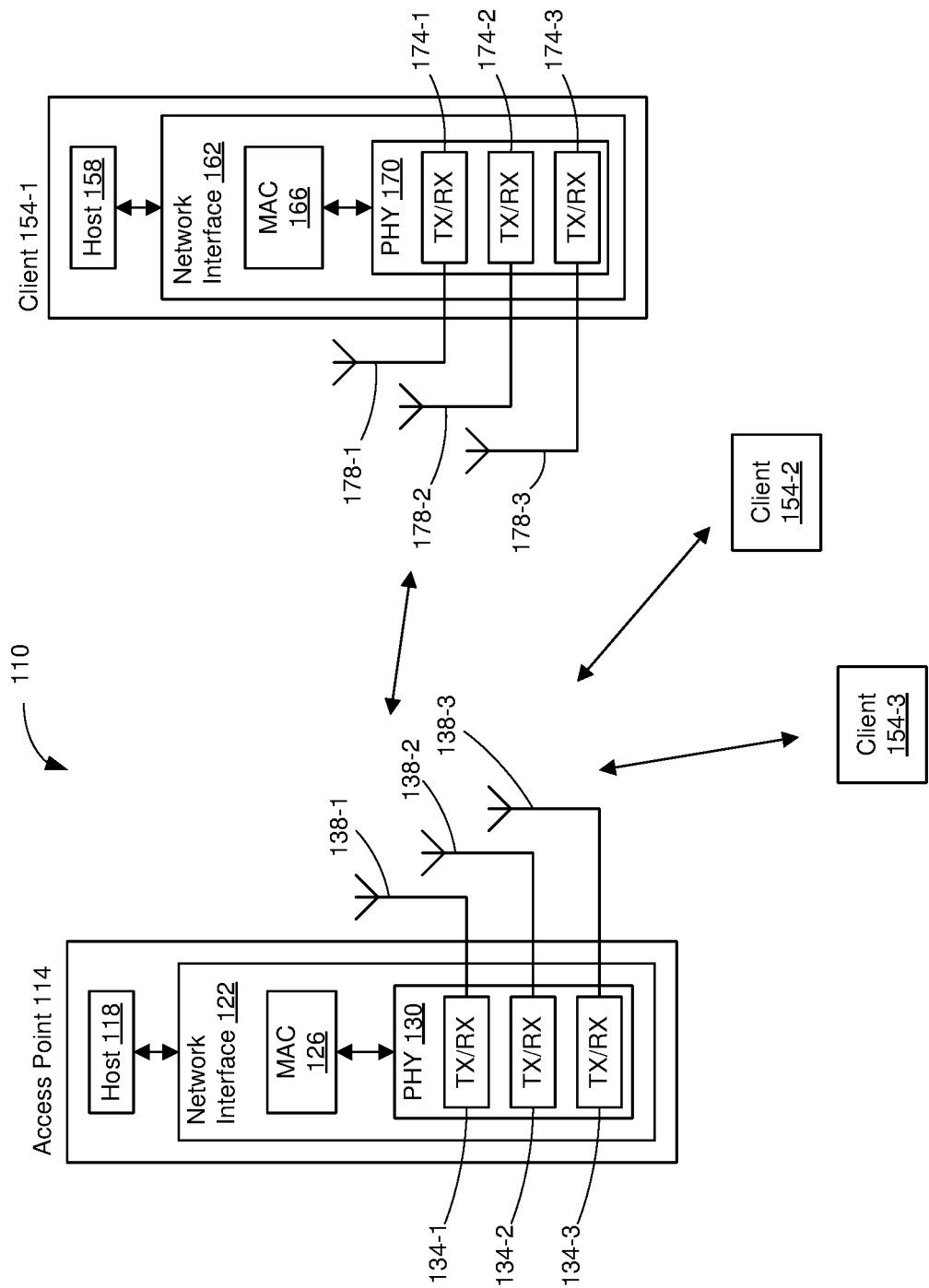
FIG. 1 is a block diagram of an example wireless local area network (WLAN), according to an embodiment.
Figure 8:
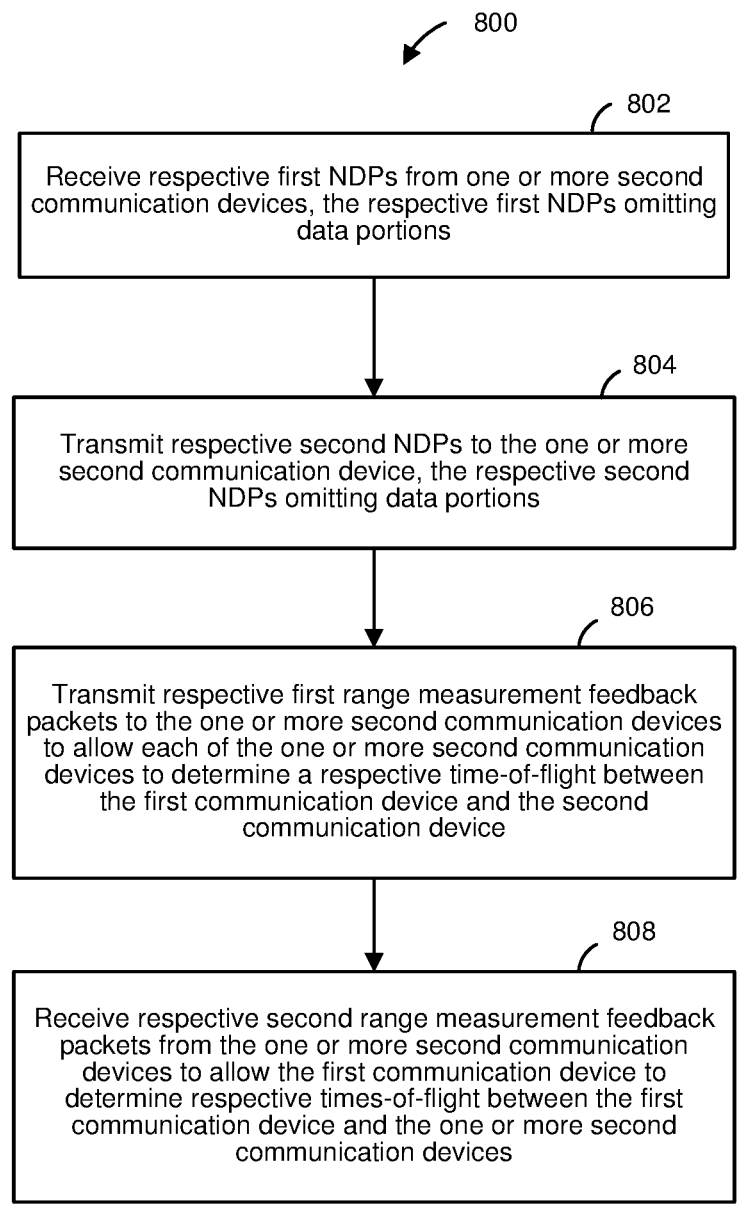

Fig. of 7A is a diagram of an antenna information element included in a beacon frame transmitted by the AP of FIG. 1, according to an embodiment;

Fig. of 7B is a diagram of an antenna information element included in a beacon frame transmitted by the AP of FIG. 1, according to another embodiment; and FIG. 8 is a flow diagram of an example method for ranging measurement in a wireless network, according to an embodiment.

DETAILED DESCRIPTION

Ranging measurement techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement techniques are utilized in other types of wireless communication systems such as personal area networks (PANs), mobile communication networks such as cellular networks, metropolitan area networks (MANs), satellite communication networks, etc.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, the AP 114 is configured to operate with client stations according to at least a first communication protocol (e.g., the IEEE 802.11ax Standard). In an embodiment, each of the client stations 154 is configured to operate at least according to the first communication protocol. In some embodiments, at least one of the client stations 154 is not configured to operate according to the first communication protocol but is configured to operate according to a second communication protocol, such as a legacy communication protocol (e.g., the IEEE 802.11ac Standard).

Figure 2A:
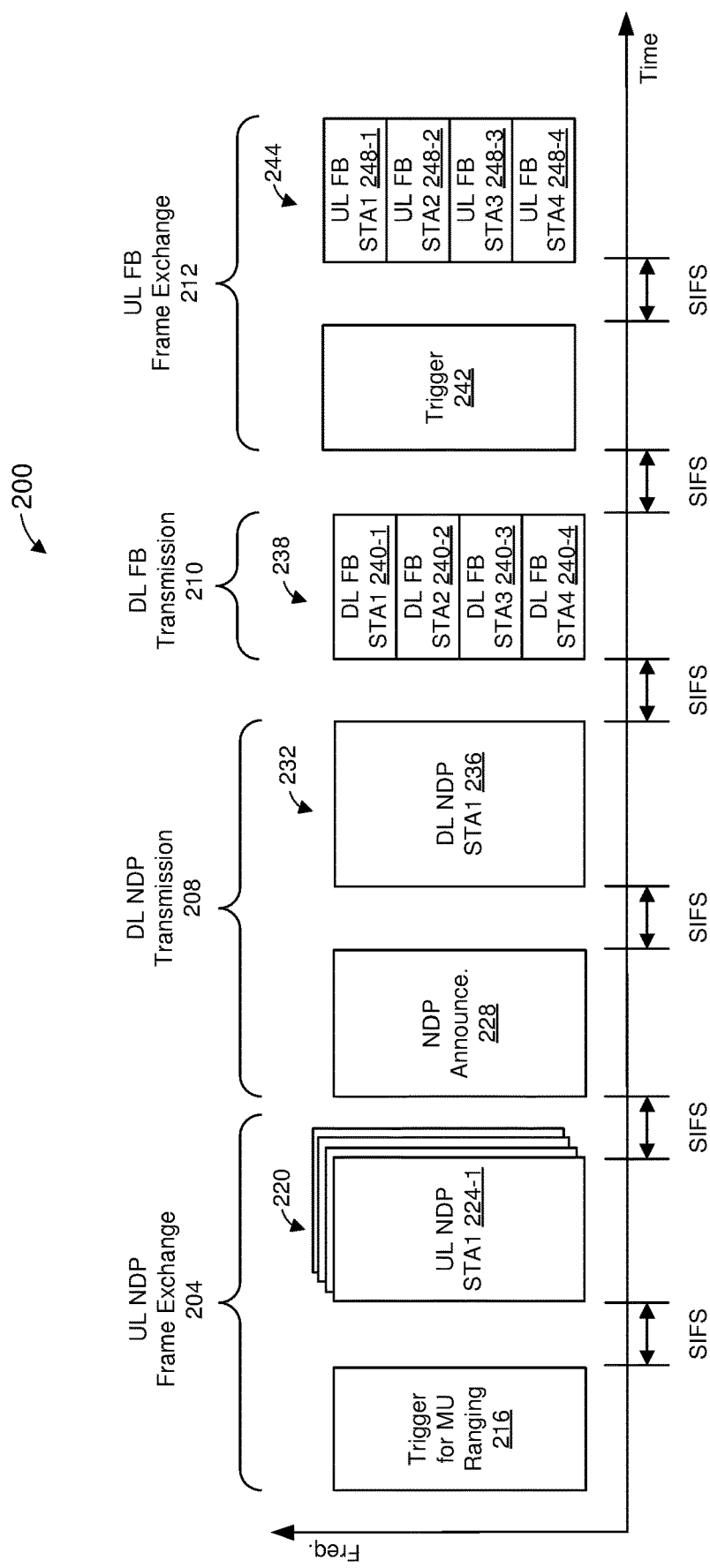
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The MU ranging measurement exchange 200 is described in the context of the example network 110 merely for explanatory purposes. In some embodiments, signals illustrated in FIG. 2A are generated by other suitable communication devices in other suitable types of wireless networks. The MU ranging measurement exchange 200 corresponds to an AP-initiated ranging measurement exchange, according to an embodiment. The MU ranging measurement exchange 200 includes an uplink (UL) null data packet (NDP) frame exchange 204, a downlink (DL) NDP transmission portion 208, a DL feedback transmission 210, and ii) an UL feedback frame exchange 212. The MU ranging measurement exchange 200 omits one of the DL feedback transmission 210 and the UL feedback frame exchange 212, in some embodiments.

In an embodiment, the UL NDP frame exchange 204, the DL NDP transmission portion 208, the DL feedback transmission 210, and the UL feedback frame exchange 212 occur within a single transmit opportunity period (TXOP). In another embodiment, the UL NDP frame exchange 204, the DL NDP transmission portion 208, the DL feedback transmission 210, and the an UL feedback frame exchange 212 do not occur within a single TXOP. For example, in an embodiment, the UL NDP frame exchange 204 and the DL NDP transmission 208 occur in a first TXOP, and the DL feedback transmission 210 and/or the UL feedback frame exchange 212 occur in one or more second TXOPs subsequent to the first TXOP. The one or more second TXOPs begin a suitable period of time after an end of the first TXOP, the suitable period of time being at least sufficiently long for feedback to be generated, in an embodiment.

In the UL NDP frame exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the trigger frame DL PPDU 216 transmission. In an embodiment, the defined time period is a short interframe space (SIFS) as defined by the IEEE 802.11 Standard. In other embodiments, another suitable time period is utilized.

The UL MU transmission 220 (which may be an UL MU multiple input, multiple output (MIMO) transmission or an UL orthogonal frequency division multiple access (OFDMA) transmission) includes UL NDPs 224 from multiple client stations 154, e.g., STA1, STA2, STA3, and STA4.

The UL NDPs 224 include PHY preambles having a legacy preamble portion including a legacy short training field (L-STF), a legacy long training field (L-LTF) and a legacy signal field (L-SIG), and a non-legacy preamble portion including one or more non-legacy STFs, one or more non-legacy LTFs, and one or more non-legacy signal fields, in an embodiment. The UL NDPs 224 omit data portions. The UL NDP packets 224 are illustrated in FIG. 2A as being transmitted using different spatial streams. In another embodiment, the UL NDP packets 224 are transmitted in different frequency bandwidth portions.

When transmitting the UL NDPs 224, each client station 154 records a time $t_{1,k}$ at which the client station 154 began transmitting the UL NDP 224, where k is an index indicating the particular client station 154. Similarly, when the AP 114 receives each UL NDP 224, the AP 114 records a time $t_{2,k}$ at which the AP 114 began receiving the UL NDP 224.

In some embodiments, when transmitting the UL NDPs 224, each of at least some of the client stations 154 (e.g., client stations 154 with multiple antennas 174) records an angle of departure, $AoD_{1,k}$, at which the UL NDP 224 left the antennas 178 of the client station 154. Similarly, when the AP 114 receives each of at least some of UL NDPs 224, the AP 114 records an angle of arrival, $AoA_{1,k}$, at which the UL NDP 224 arrived at the antennas 138 of the AP 114.

Figure 2B:
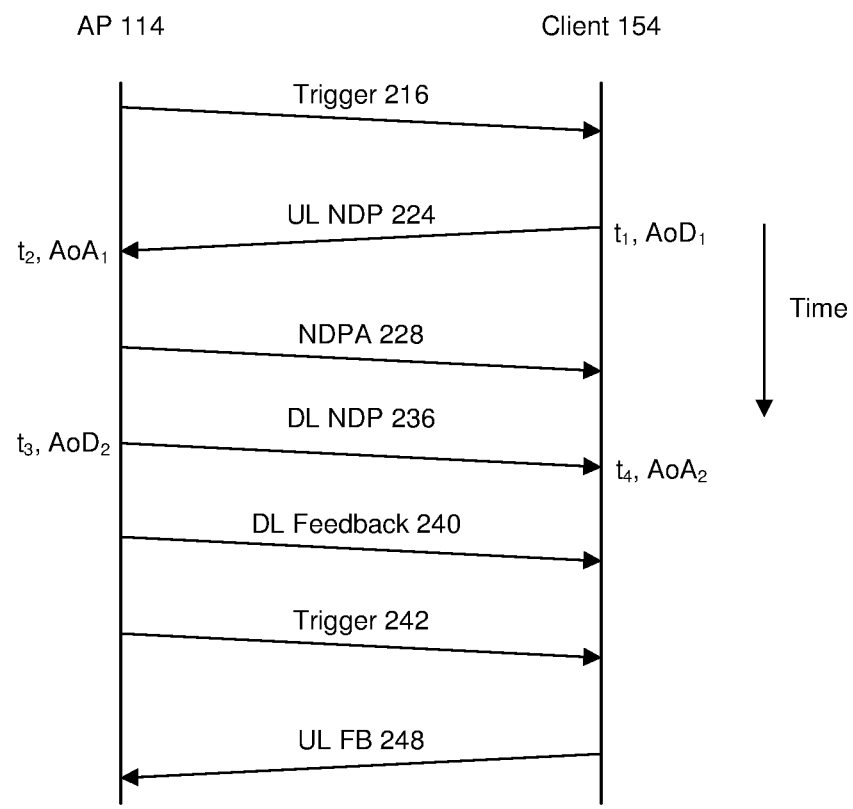
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, a client station 154 records the time $t_1$ at which the client station 154 began transmitting the UL NDP 224, and records the $AoD_1$ at which the UL NDP 224 left the antennas 178 of the client station 154. Additionally, the AP 114 records the time $t_2$ at which the AP 114 began receiving the UL NDP 224, and the $AoA_1$, at which the UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment. In some embodiments, the DL NDP transmission 208 omits the DL PPDU 228 that includes the NDPA frame.

The AP 114 begins transmitting a DL transmission 232 a defined time period after an end of the DL PPDU 228 (or after an end of the UL MU transmission 220 if the DL PPDU 228 is omitted). In an embodiment, the defined time period is SIFS. In other embodiments, another suitable time period is utilized. The DL transmission 232 includes a SU DL PPDU 236 (with a broadcast address) to the client stations 154. The DL NDP 236 includes a PHY preamble having a legacy preamble portion including an L-STF, an L-LTF and an L-SIG, and a non-legacy preamble portion including one or more non-legacy STFs, one or more non-legacy LTFs, and one or more non-legacy signal fields, in an embodiment. The DL NDP 236 omits a data portion. Although the DL transmission 232 is illustrated in FIG. 2A as being an SU transmission that includes a single DL NDP 236 transmitted to multiple client stations 154, in another embodiment, the DL transmission 232 is an MU transmission that includes respective DL NDPs 236 transmitted to respective ones of the multiple client stations 154. In various embodiment, respective DL NDPs are transmitted to respective ones of the multiple client stations 154 in different frequency bandwidth portions (e.g., OFDMA) or are transmitted to respective ones of the multiple client stations 154 using different spatial streams (e.g., MU-MIMO). In some such embodiments, a frequency bandwidth portion and/or a spatial stream in which a respective DL NDP 236 is transmitted from the AP 114 to a client station 154 corresponds to the frequency bandwidth portion and/or the spatial stream in which a respective UL NDP 224 was transmitted to the AP 114 by the client station 154. Transmission of respective UL NDPs 224 and the corresponding DL NDPs 236 to and from respective client stations 154 in corresponding frequency bandwidth portions and/or using corresponding spatial steams ensures timing measurement accuracy in the ranging measurement exchange 200, in at least some embodiments.

When transmitting the DL NDP 236, the AP 114 records a time $t_{3,k}$ at which the AP 114 began transmitting the DL NDP 236. Similarly, when each client station 154 receives the corresponding DL NDP 236, the client station 154 records a time $t_{4,k}$ at which the client station 154 began receiving the DL NDP 236. As illustrated in FIG. 2B, the AP 114 records the time $t_3$ at which the AP 114 began transmitting the DL NDP 236, and the client station 154 records the time $t_4$ at which the client station 154 began receiving the DL NDP 236.

In some embodiments, when transmitting the DL NDP 236, the AP 114 records an $AoD_2$ at which the DL NDP 236 left the antennas 138 of the AP114. Similarly, when the client station 154 receives the DL NDP 236, the client station 154 records an $AoA_2$ at which the DL NDP 236 arrived at the antennas 178 of the client station 154.

After the DL NDP transmission 208, the AP 114 transmits a DL transmission 238, in an embodiment. The AP 114 begins transmitting the DL transmission 238 a defined time period after an end of the DL NDP transmission 208, in an embodiment. In an embodiment, the defined time period is SIFS. In other embodiments, another suitable time period is utilized. The DL PPDUs 240 are illustrated in FIG. 2A as being transmitted in different frequency bandwidth portions (e.g., OFDMA). In some embodiments, the DL PPDUs 240 are transmitted using different spatial streams (e.g., MU-MIMO).

The PPDUs 240 correspond to downlink ranging measurement feedback packets. The PPDUs 240 respectively include the recorded times $t_{2,k}$ and $t_{3,k}$. In some embodiments, each of one or more PPDUs 240 respectively includes the recorded angles $AoA_{1,k}$ and $AoD_{2,k}$. In some embodiments, the PPDUs 240 optionally also include respective channel estimate information determined by the AP 114 based on reception of the UL NDPs 224 received from the client stations 154.

In some embodiments, the client stations 154 transmit acknowledgement packets (not shown) to acknowledge receipt of PPDUs 240. The acknowledgement packets are transmitted simultaneously as parts of a UL MU transmission (which may be an UL OFDMA transmission or an UL MU-MIMO transmission), in an embodiment. In an embodiment, if the AP 114 does not receive an acknowledgement packet from one or more of the client stations 154, the AP 114 can re-transmit the corresponding ranging measurement feedback packets to the one or more client stations 154. In other embodiments, the client stations 154 do not transmit acknowledgement packets to acknowledge receipt of PPDUs 240. In such embodiments, feedback measurement packets are not re-transmitted.

After receipt of its respective PPDU 240, the client station 154 calculates a time-of-flight between the client station 154 and the AP 114 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. A distance between the client station 154 and the AP 114 may be calculated using the calculated time-of-flight, e.g., by respectively multiplying the time-of-flight by the speed of light, according to an embodiment.

In some embodiments, the client station 154 calculates its estimated position using the calculated time-of-flight. For example, the client station 154 uses triangulation techniques to calculate its estimated position using the calculated time-of-flight. In some embodiments, the client station 154 calculates its estimated position also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of client station 154.

In an embodiment, the AP 114 transmits a DL PPDU 242 that includes a trigger frame to cause the group of client stations 154 to simultaneously transmit, as part of an UL MU transmission 244, uplink PPDUs 248 that include ranging measurement feedback. The trigger frame in the DL PPDU 242 causes multiple client stations 154 to begin simultaneously transmitting the UL MU transmission 244 a defined time period after an end of the PPDU 242. In an embodiment, the defined time period is SIFS. In other embodiments, another suitable time period is utilized.

The UL MU transmission 244 (which may be an UL OFDMA transmission or an UL MU-MIMO transmission) includes UL PPDUs 248 from multiple client stations 154, e.g., STA1, STA2, STA3, and STA4. The PPDUs 248 are illustrated in FIG. 2A as being transmitted in different frequency bandwidth portions. In another embodiment, the UL PPDUs 248 are transmitted using different spatial streams.

The PPDUs 248 correspond to uplink ranging measurement feedback packets. The PPDUs 248 respectively include the recorded times $t_{1,k}$ and $t_{4,k}$. In some embodiments, each of one or more PPDUs 248 respectively includes the recorded angles $AoD_1$ and $AoA_2$. In some embodiments, the PPDUs 248 optionally also include respective channel estimate information determined by the client station 154 based on reception of the DL NDPs 236.

In some embodiments, the AP 114 transmit acknowledgement packets (not shown) to acknowledge receipt of PPDUs 248. The acknowledgement packets are transmitted simultaneously as parts of a DL MU transmission (which may be an DL OFDMA transmission or an DL MU-MIMO transmission), in an embodiment. In an embodiment, if one or more of the client stations 154 do not receive an acknowledgement packet from the AP 114, the one or more client stations 154 can re-transmit the corresponding ranging measurement feedback packets to the AP 114. In other embodiments, the AP 114 does not transmit acknowledgement packets to acknowledge receipt of PPDUs 248. In such embodiments, feedback measurement packets are not re-transmitted.

After receipt of the PPDUs 248, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining positions of communication devices.

FIG. 3A is a diagram of an example single-user (SU) ranging measurement exchange 300 in an SU ranging measurement procedure, according to an embodiment. The SU ranging measurement exchange 300 is described in the context of the example network 110 merely for explanatory purposes. In some embodiments, signals illustrated in FIG. 3A are generated by other suitable communication devices in other suitable types of wireless networks.

The SU ranging measurement exchange 300 corresponds to a client-initiated ranging measurement exchange, according to an embodiment. The SU ranging measurement exchange 300 includes an UL NDP transmission portion 304, a DL NDP transmission portion 308, and a feedback frame exchange 312. In an embodiment, the UL NDP transmission portion 304, the DL NDP transmission portion 308, and the feedback frame exchange 312 occur within a single TXOP. In another embodiment, the UL NDP transmission portion 304, the DL NDP transmission portion 308, and the feedback frame exchange 312 do not occur within a single TXOP. For example, in an embodiment, the UL NDP transmission portion 304 and the DL NDP transmission portion 308 occur in a first TXOP, and the feedback frame exchange 312 occurs in a second TXOP subsequent to the first TXOP. The second TXOP begins a suitable period of time after an end of the first TXOP, the suitable period of time being sufficiently long for feedback transmission to be generated, in an embodiment.

In the UL NDP transmission portion 304, a first communication device (e.g., the client station 154) transmits an UL PPDU 316 that includes an NDPA frame or a trigger frame. The NDPA frame or the trigger frame in the PPDU 316 is configured to cause a second communication device (e.g., the AP 114) to be prepared to receive an NDP from the client station 154, according to an embodiment. In an embodiment, the NDPA frame or the trigger frame in the PPDU 316 is a type of NDPA frame specifically for initiating SU ranging measurement exchange such as the SU ranging measurement exchange 300.

The client station 154 begins transmitting an UL NDP 320 a defined time period after an end of the UL PPDU 316. In an embodiment, the defined time period is SIFS. In other embodiments, another suitable time period is utilized. The UL NDP 320 includes a PHY preamble having a legacy preamble portion including an L-STF, an L-LTF and an L-SIG, and a non-legacy preamble portion including one or more non-legacy STFs, one or more non-legacy LTFs, and one or more non-legacy signal fields, in an embodiment. The UL NDP 320 omits a data portion. When transmitting the UL NDP 320, the client station records a time $t_1$ at which the client station 154 began transmitting the UL NDP 320. Similarly, when the AP 114 receives the UL NDP 320, the AP 114 records a time $t_2$ at which the AP 114 began receiving the UL NDP 320.

In some embodiments in which the client station 154 includes multiple antennas 178, the client station 154 records an $AoD_1$ at which the UL NDP 320 left the antennas 178 of the client station 154. Similarly, in some embodiments in which the AP 114 includes multiple antennas 138, the AP 114 records an $AoA_1$ at which the UL NDP 320 arrived at the antennas 138 of the AP 114, according to an embodiment.

Figure 3B:
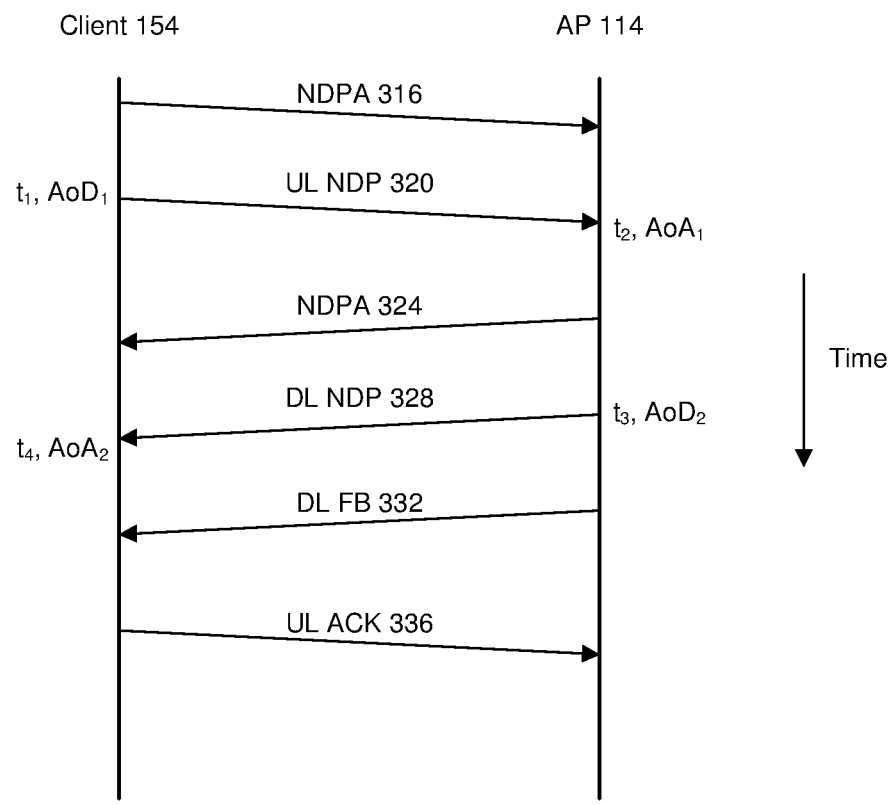
FIG. 3B is a timing diagram of the example SU ranging measurement exchange of FIG. 3A, according to an embodiment.

FIG. 3B is a timing diagram of the example SU ranging measurement exchange 300 of FIG. 3A. As illustrated in FIG. 3B, the client station 154 records the time $t_1$ at which the client station 154 began transmitting the UL NDP 320, and records the $AoD_1$ at which the UL NDP 320 left the antennas 178 of the client station 154. Additionally, the AP 114 records the time $t_2$ at which the AP 114 began receiving the UL NDP 320, and the $AoA_1$, at which the UL NDP 320 arrived at the antennas 138 of the AP 114.

Referring now to FIGS. 3A and 3B, a defined time period after an end of transmission of the UL NDP 320 if DL PPDU 224, the AP 114 begins transmitting a DL NDP 328. In an embodiment, the defined time period is STS. In other embodiments, another suitable time period is utilized. The DL NDP 328 includes a PHY preamble having a legacy preamble portion including an L-STF, an L-LTF and an L-SIG, and a non-legacy preamble portion including one or more non-legacy STFs, one or more non-legacy LTFs, and one or more non-legacy signal fields, in an embodiment. The DL NDP 328 omits a data portion. When transmitting the DL NDP 328, the AP 114 records a time $t_3$ at which the AP 114 began transmitting the DL NDP 328. Similarly, when the client station 154 receives the DL NDP 328, the client station records a time $t_4$ at which the client station 154 began receiving the DL NDP 328. In some embodiments, prior to transmission of the DL NDP 328, the AP 114 transmits a DL PPDU that includes an NDPA frame (not shown) to prompt the client station 154 to be prepared to receive an NDP from the AP 114.

In some embodiments, when transmitting the DL NDP 328, the AP 114 records an $AoD_2$ at which the DL NDP 328 left the antennas 138 of the AP 114. Similarly, in some embodiments, when the client station 154 receives the DL NDP 328, the client station 154 records an $AoA_2$ at which the DL NDP 328 arrived at the antennas 178 of the client station 154.

Next, the AP 114 begins transmitting an DL PPDU 332 that includes ranging measurement feedback (e.g., a ranging measurement feedback packet) a defined time period after an end of the DL NDP 328. In an embodiment, the defined time period is SIFS. In other embodiments, another suitable time period is utilized.

The PPDU 332 corresponds to a ranging measurement feedback packet. The PPDU 332 includes the recorded times $t_2$ and $t_3$. In some embodiments, the PPDU 332 includes the recorded angles $AoD_1$ and $AoA_2$. In some embodiments, the PPDU 332 optionally also include respective channel estimate information determined by the AP 114 based on reception of the UL NDP 320. In some embodiments, in response to the PPDU 332, the client station 154 transmits an acknowledgement to the AP 114 to acknowledge receipt of the PPDU 332 to the AP 114. In another embodiment, the client station 154 does not transmit an acknowledgement to the AP 114.

After receipt of the PPDU 332, the client station 154 calculates a time-of-flight between the client station 154 and the AP 114 using the recorded times $t_1$, $t_2$, $t_3$, and $t_4$, according to an embodiment. Any suitable technique, including currently known techniques, may be utilized to calculate a time-of-flight using the recorded times $t_1$, $t_2$, $t_3$, and $t_4$. A distance between the client station 154 and the AP 114 may be calculated using the calculated time-of-flight, e.g., by multiplying the time-of-flight by the speed of light, according to an embodiment.

In some embodiments, the client station 154 calculates its estimated position using the calculated time-of-flight. For example, the client station 154 uses triangulation techniques to calculate its estimated position using the calculated time-of-flight. In some embodiments, the client station 154 calculates its estimated position also using the recorded angles $AoD_1$, $AoA_1$, $AoD_2$, and $AoA_2$. For example, the recorded angles $AoD_1$, $AoA_1$, $AoD_2$, and $AoA_2$ are used as part of a triangulation algorithm for determining a position of the client station 154.

Figure 4A:
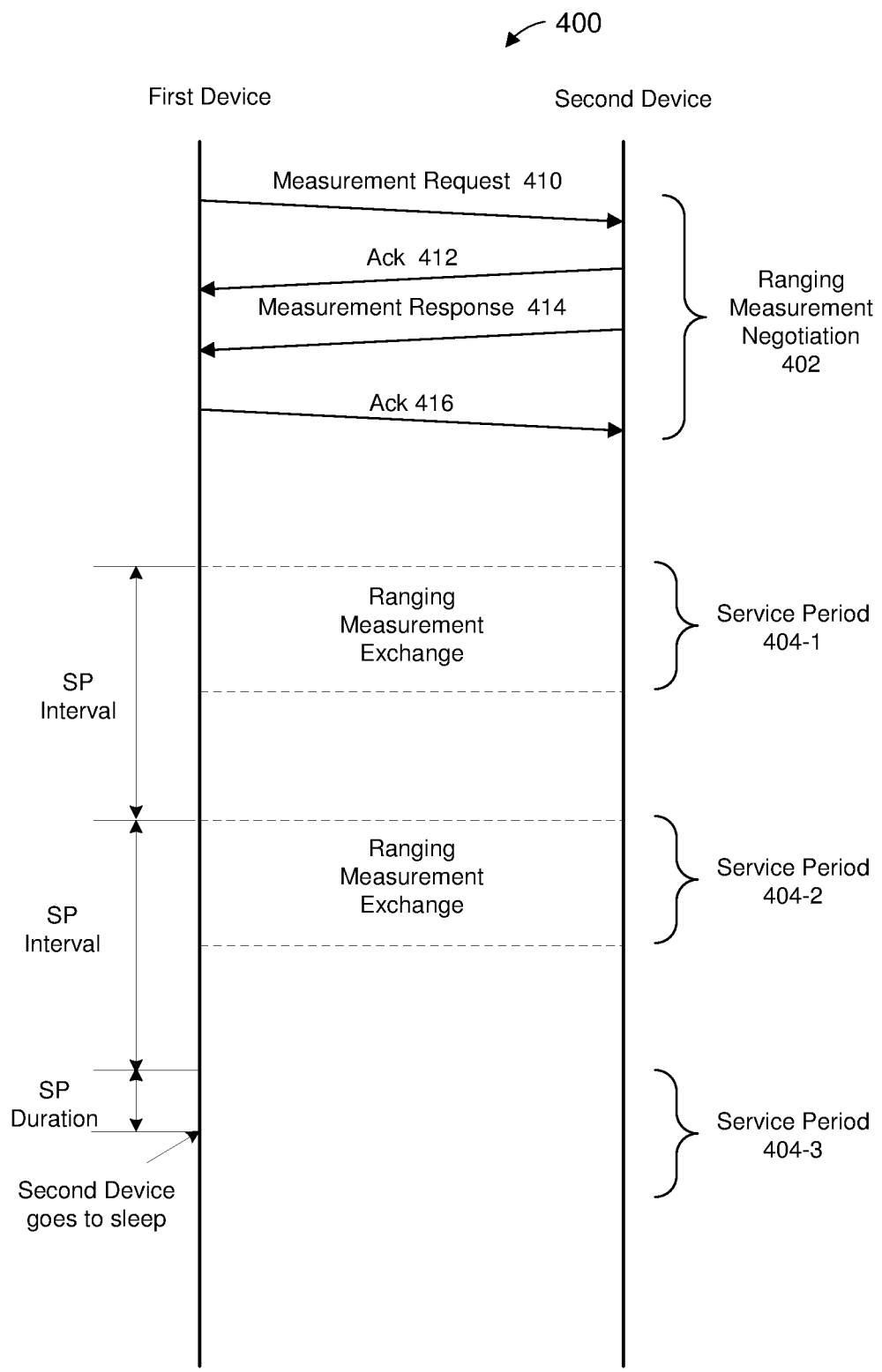
FIG. 4A is a timing diagram of a ranging measurement procedure, according to an embodiment.

FIG. 4A is a timing diagram of a ranging measurement procedure 400 conducted between a first communication device (e.g., AP 114) and one or more second communication devices (e.g., client stations 154), according to an embodiment. The ranging measurement procedure 400 includes a ranging measurement negotiation phase 402 and a plurality of service periods (SP) 404 for ranging measurement exchanges. In an embodiment, the ranging measurement procedure 400 is an MU ranging measurement procedure, and each SP 404 includes a respective instance of the MU ranging measurement exchange 200 of FIG. 2A. In another embodiment, the ranging measurement procedure 400 is an SU ranging measurement procedure, and each SP 404 includes a respective instance of the SU ranging measurement exchange 300 of FIG. 3A. Although the ranging measurement procedure 400 is illustrated in FIG. 4A as including three SPs 404, the ranging measurement procedure 400 includes other suitable numbers (e.g., 2, 4, 5, 6, etc.) of SPs 404, in other embodiments. In some embodiment, the ranging measurement procedure 400 includes only a single SP 404.

In the ranging measurement negotiation 402, a first communication device transmits a PPDU 410 that corresponds to a ranging measurement request packet. The PPDU 410 includes a ranging measurement parameters element having one or more fields to indicate ranging measurement parameters that the first communication device is capable of operating with and/or that the first communication device requests to be used in the ranging measurement procedure 400. The second communication device receives the PPDU 410 and transmits an acknowledgement 412 to acknowledge receipt of the PPDU 410. Responsive to the PPDU 410, the second communication device transmits a PPDU 414 that corresponds to a ranging measurement response packet. The PPDU 414 includes a ranging measurement parameters element having one or more fields to indicate ranging measurement parameters that the second communication device is capable of operating with and/or whether the ranging measurement parameters requested in PPDU 410 are accepted by the second communication device. If a ranging measurement parameter requested in the PPDU 410 is not accepted by the second communication device, the ranging measurement parameters element in the PPDU 414 indicates an alternative value of the ranging measurement parameter to be used, in an embodiment. Thereafter, thus negotiated ranging measurement parameters are used to conduct the one or more ranging measurement exchanges 402, in an embodiment.

FIG. 4B is a block diagram of a ranging measurement parameters element 450 included in the PPDU 410 and the PPDU 414, according to an embodiment. In the embodiment illustrated in FIG. 4B, the ranging measurement parameters element 450 includes a plurality of fields 452, including an OFDM tone grouping (Ng) field 452-1, a number of columns (Nc) field 452-2, a codebook size field 452-3, a bandwidth (BW) field 452-4, a LTF type field 452-5, an LFT number field 452-6, an AoA field 452-7, an AoD field 452-8, a ToA field 452-9, a ToD field 425-10, a measurement start time field 452-11, an SP interval field 452-12 and an SP duration field 452-13. In other embodiments, the ranging measurement parameters element 450 omits one or more of the fields 452 illustrated in FIG. 4B and/or includes one or more additional fields not illustrated in FIG. 4B.

The Ng field 452-1, the Nc field 452-2 and the codebook size field 452-3 indicate maximum values of, respectively, Ng, Nc and codebook size supported and/or values of, respectively, Ng, Nc and codebook size to be used for channel information feedback in the one or more SPs 404, in an embodiment. The BW field 452-4 indicates a bandwidth over which the ranging measurements are to be performed (e.g., BW of the NDPA/NDP packets to be transmitted). The LTF type field 452-5 and the LFT number field 452-6 indicate, respectively, a type of and a number of LTFs supported and/or to be included in the NDPA/NDP packets transmitted in the one or more SPs 404.

The AoA field 452-7, the AoD field 452-8, the ToA field 452-9, and the ToD field 425-10 indicate, respectively, whether or not angle of arrival, angle of departure, time of arrival and time of departure measurements are supported and/or are to be performed. The measurement start time field 452-11 indicates a start time of a next SP 404 following the negotiation. The service period (SP) field 452-12 indicates an interval between two consecutive service periods. The SP duration field 452-13 indicates an amount of time after the beginning of an SP that the responder device should listen to the medium before the responder device can enter sleep state if nothing is received by the responder device. In the embodiment of FIG. 4B, the ranging measurement procedure 400 includes three SPs 420 scheduled and/or negotiated between the first communication device and the one or more second communication devices. The ranging measurement procedure 400 includes other suitable numbers of SPs 420 in other embodiments. As illustrated in FIG. 4B, during a third SP 420-3, the second communication device does not receive anything from the first communication devices. Accordingly, after listening to the medium for a period of time corresponding to the SP duration, the second communication device goes into a sleep state, in the illustrated embodiment.

Referring now to FIGS. 4A and 4B, the ranging measurement procedure 400 includes a single ranging measurement negotiation phase 402 to negotiate parameters for ranging measurement exchanges in a plurality of following SPs 404, in the illustrated embodiment. In another embodiment, a separate ranging measurement negotiation 402 is conducted for each of the ranging measurement exchanges. In some embodiments, the ranging measurement parameters element 450 included in PPDU 410 and the PPDU 414 transmitted in the ranging measurement negotiation phase 402 omits some of the fields 452, or the ranging measurement negotiation phase 402 is entirely omitted from the ranging measurement procedure 400. For example, some or all of the ranging measurement parameters corresponding to the field 452 are default parameters defined in a communication protocol (e.g., the IEEE 802.11az Standard), and such some or all of the ranging measurement parameters needed not be negotiated between the first communication device and the one or more second communication devices. As another example, some or all of the ranging measurement parameters are signaled by the first communication device (e.g., the AP 114) in a beacon frame and/or are pre-negotiated between the first communication device (e.g., the AP 114) and the one or more second communication devices (e.g., client stations 154) in a probe request probe response exchange or association request association response exchange, for example.

In some embodiments, the one or more second communication devices participating in the procedure 400 are expected to be ready (e.g., awake) to begin a ranging measurement exchange at the beginning of each SP 404. For example, in an embodiment in which the SP 404 includes an SU ranging measurement frame exchange such as the SU ranging measurement exchange 300, and the second communication device is the AP 114 rather than a client station 154, second communication device is expected to be ready to begin a ranging measurement exchange at the beginning of an SP 404, in an embodiment. As another example, the one or more second communication devices are expected to be ready to begin a ranging measurement exchange at the beginning of an SP 404 when the SP 404 is negotiated to be an unannounced implicit target wake time (TWT) service period. In other embodiments and/or scenarios, the one or more second communication devices participating in the procedure 400 are not expected to necessarily be ready (e.g., awake) to begin a ranging measurement exchange at the beginning of each SP 404. In such embodiments, the ranging measurement procedure 400 may include a polling phase or a notification phase before an SP 404, to poll readiness of the one or more second communication devices and/or to prompt the one or more second communication devices to be ready to begin a ranging measurement exchange.

Figures 4C, 4D:
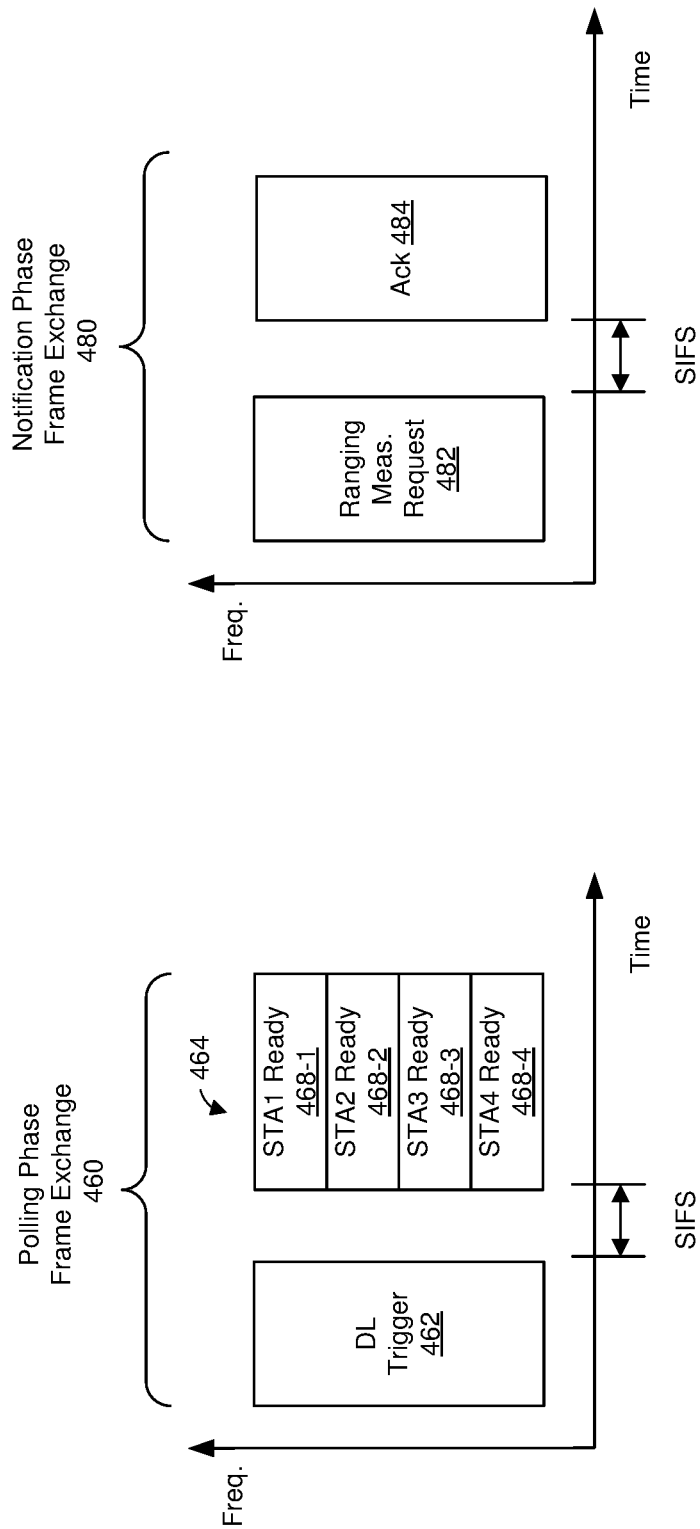
FIG. 4C is a diagram of an example polling phase frame exchange used with the ranging measurement procedure of FIG. 4A, according to an embodiment.
FIG. 4D is a diagram of an example notification phase frame exchange used with the ranging measurement procedure of FIG. 4A, according to an embodiment.

FIG. 4C is a diagram of an example polling phase frame exchange 460, according to an embodiment. In an embodiment, the polling phase frame exchange 460 occurs before each SP 404 in the ranging measurement procedure 400. In an embodiment, the polling phase frame exchange 460 and a beginning of a corresponding SP 404 occur within a single TXOP. In another embodiment, the polling phase frame exchange 460 and a beginning of a corresponding SP 404 do not occur within a single TXOP.

In the polling phase frame exchange 460, the first communication device transmits a PPDU 462 that includes a trigger frame to the one or more second communication devices participating in the ranging measurement procedure 400. The trigger frame included in the PPDU 462 causes the one or more second communication devices to simultaneously transmit, as part of an uplink (UL) MU transmission 464 (which may be an UL orthogonal frequency division multiple access (OFDMA) transmission or an UL MU multiple input, multiple output (MIMO) transmission), PPDUs 468 that include poll response frames. After transmission of the PPDUs 468, the one or more second communication devices are awake and ready for the upcoming SP 404, in an embodiment.

FIG. 4D is a diagram of an example notification phase frame exchange 480, according to an embodiment. In an embodiment, the notification phase frame exchange 480 occurs before each SP 404 in the ranging measurement procedure 400. In an embodiment, the notification phase frame exchange 480 and a beginning of a corresponding SP 404 occur within a single TXOP. In another embodiment, the notification phase frame exchange 480 and a beginning of a corresponding SP 404 do not occur within a single TXOP.

In the notification phase frame exchange 480, the first communication device transmits a PPDU 482 that includes a ranging measurement request frame to a second communication device participating in the ranging measurement procedure 400. In response to the PPDU 482, the second communication device transmits an acknowledgement 484 to the first communication device. After transmission of the acknowledgement 484, the second communication device is awake and ready for the upcoming SP 404, in an embodiment. In an embodiment, if multiple second communication devices are participating in the ranging measurement procedure 400, the ranging measurement procedure 400 includes respective notification phase frame exchanges 480 between the first communication device and each of the multiple second communication devices.

Figure 5A:
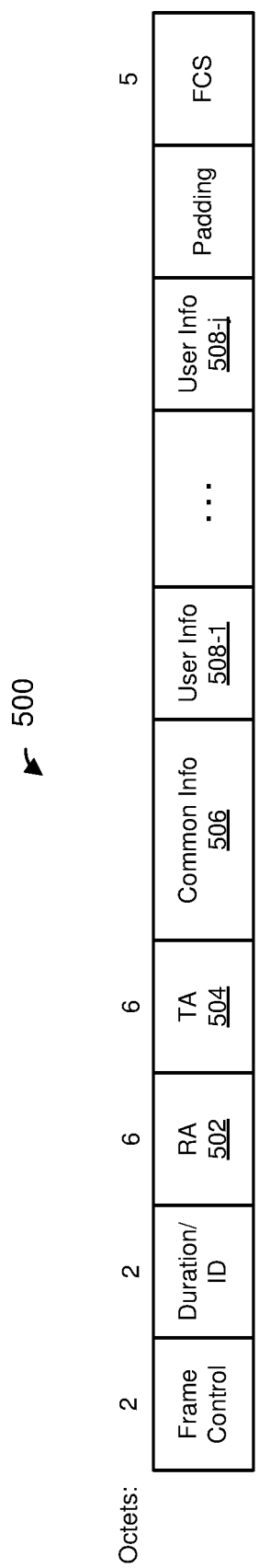
FIG. 5A is a diagram of an example trigger frame used in a ranging measurement exchange, according to an embodiment.

FIG. 5A is a diagram of an example trigger frame 500, according to an embodiment. In an embodiment, the trigger frame 500 is generated and transmitted by a first communication device (e.g., the AP 114) to cause one or more second communication devices (e.g., client stations 154) to transmit NDP packets in a ranging measurement exchange. In an embodiment, the trigger frame 500 corresponds to the trigger frame in the PPDU 216 in the ranging measurement exchange 200 of FIG. 2. In another embodiment, the trigger frame 500 corresponds to a trigger frame included in the PPDU 316 in the ranging measurement exchange 300 of FIG. 3. In another embodiment, the trigger frame 500 is used with suitable ranging measurement exchanges different from the ranging measurement exchange 200 of FIG. 2 or the ranging measurement exchange 300 of FIG. 3. Similarly, the ranging measurement exchange 200 of FIG. 2 or the ranging measurement exchange 300 of FIG. 3 utilizes a trigger frame different from the trigger frame 500, in some embodiments.

FIG. 5A includes example numbers of octets of various fields of the trigger frame 500. In other embodiments, different suitable numbers of octets and bits are utilized. Fields in FIG. 5A that do not have an associated number of octets/bits are of a suitable length and/or a variable length. In some embodiment, one or more of the fields illustrated in FIG. 5A are omitted and/or one or more additional fields not illustrated in FIG. 5A are included.

The trigger frame 500 includes a receiver address (RA) field 504 to indicate an intended receiver of the trigger frame 500. The RA field 502 can be set to a unicast address (e.g., a unicast MAC address) to specify a single communication device, a multicast address (e.g., a multicast MAC address) to specify a particular group of communication devices, or a broadcast address (e.g., a broadcast MAC address) to specify all communication devices, in some embodiments. The trigger frame 500 also includes a transmitter address (TA) field 504 to indicate the transmitter of the trigger frame 500. The TA field 504 can be set to a unicast address (e.g., a unicast MAC address) corresponding to the network interface 122 or the network interface 162, for example. The trigger frame 500 also includes a common information field 506 to indicate common information for the one or more second communication devices being prompted by the trigger frame 500, and one or more user information fields 508 to indicate user specific information for each of the one or more second communication devices being prompted by the trigger frame 500.

FIG. 5B is a block diagram of a common information field 515, according to an embodiment. In an embodiment, the common information field 515 corresponds to the common information field 506 of the trigger frame 500 of FIG. 5A. In another embodiment, the common information field 515 is used with a trigger frame different from the trigger frame 500 of FIG. 5A. The common information field 515 includes a plurality of subfields 520, including a trigger type subfield 520-1, a length subfield 520-2, a cascade indication subfield 520-3, a carrier sense (CS) required subfield 520-4, a bandwidth (BW) subfield 520-5, a guard interval (GI) and LTF type subfield 520-6, an MU-MIMO LTF mode subfield 520-7, a number of HE-LTF symbols subfield 520-8, a space-time block coding (STBC) subfield 520-9, a low density parity check (LDPC) extra symbol subfield 520-10, an AP Tx power subfield 520-11, a packet extension subfield 520-12, a spatial reuse subfield 520-13, an HE-SIG-A reserved subfield 520-15, a reserved subfield 520-16, and a trigger dependent common information subfield 520-17, in an embodiment. FIG. 5B includes example numbers of bits of the subfields 520. In other embodiments, different suitable numbers of bits are utilized. Subfields 520 that do not have an associated number of bits in FIG. 5B are of a suitable length and/or a variable length. In some embodiments, one or more of the subfields 520 illustrated in FIG. 5B are omitted, and/or one or more additional subfields are included.

The trigger type subfield 520-1 is set to indicate a particular trigger type or subtype of the trigger frame 500. In an embodiment, the particular type or subtype selected from among a plurality of trigger variants defined by a communication protocol (e.g., the IEEE 802.11ax Standard). In an embodiment, the trigger type field 520-1 is set to indicate that the trigger frame 500 is of a ranging measurement trigger variant, such as a trigger type for prompting UL NDP transmission in a ranging measurement exchange.

The cascade indication subfield 520-3 is set to a value of logic one (1) to indicate that at least one more ranging measurement exchanges between the first communication device and the one or more second communication devices identified in the one or more user information fields 508 is to follow the current ranging measurement exchange, and is set to a value of logic zero (0) to indicate that no additional ranging measurement exchanges between the first communication device and the one or more second communication devices identified in the one or more user information fields 508 are to follow, or vice versa, in an embodiment.

The CS required subfield 520-4 is set to indicate whether the one or more second communication devices identified in the user information fields 508 are required to use energy detection (ED) to sense the medium and to consider navigation vector (NAV) in determining whether or not to respond to the trigger frame 500. In an embodiment, a value of logic one (1) in the CS required subfield 520-4 indicates that ED sensing and NAV consideration is required, and a value of logic zero (0) in the CS required subfield 520-4 indicates that ED sensing/NAV consideration is not required, or vice versa. In an embodiment, ED sensing/NAV consideration is required during ranging measurement exchanges. In this embodiment, when the trigger type subfield 520-1 indicates that the trigger frame 500 is of a ranging measurement trigger variant, the CS required subfield 520-4 is set (e.g., to a logic one (1)) to indicate that ED sensing/NAV consideration is required. In another embodiment, ED sensing/NAV consideration is not necessarily required during ranging measurement exchanges, and the CS required subfield 520-4 may be set to (e.g., a logic zero (0)) to indicate that ED sensing/NAV consideration is not required in at least some scenarios.

The BW subfield 520-5 is set to indicate a bandwidth of the trigger frame 500. In an embodiment, the BW subfield 520-5 also indicates the BW of the NDP transmission (e.g., SU or MU NDP transmission) being prompted by the trigger frame 500. The AP Tx power subfield 520-11 is set to indicate transmit power of the trigger frame 500.

The spatial reuse subfield 520-13 is set to indicate whether or not spatial reuse is allowed. In an embodiment, spatial reuse is not allowed during ranging measurement exchanges. Accordingly, in this embodiment, when the trigger type subfield 520-1 indicates that the trigger frame 500 is of a ranging measurement trigger variant, the spatial reuse subfield 520-13 is set to indicate that spatial reuse is disallowed during the ranging measurement exchange. In another embodiment, spatial reuse is not necessarily disallowed during ranging measurement exchanges, and the spatial reuse subfield 520-13 may be set to indicate that spatial reuse is not disallowed in at least some scenarios.

In an embodiment, one or more of the MU-MIMO LTF mode subfield 520-7, the STBC subfield 520-9, the LDPC extra symbol subfield 520-10, the packet extension subfield 520-12, and the Doppler subfield 520-14 correspond to subfields of a trigger frame (e.g., general trigger frame) format that is not specifically for prompting a ranging measurement exchange, and the one or more of the MU-MIMO LTF mode subfield 520-7, the STBC subfield 520-9, the LDPC extra symbol subfield 520-10, the packet extension subfield 520-12, and the Doppler subfield 520-14 are not needed in ranging measurement exchanges. Accordingly, in an embodiment, when the trigger type subfield 520-1 indicates that the trigger frame 500 is of a ranging measurement trigger variant, one or more of the MU-MIMO LTF mode subfield 520-7, the STBC subfield 520-9, the LDPC extra symbol subfield 520-10, the packet extension subfield 520-12, and the Doppler subfield 520-14 are reserved or omitted. Similarly, the trigger dependent common information subfield 520-17 is not needed in ranging measurement exchanges, and the trigger dependent common information subfield 520-17 is reserved or omitted, in an embodiment.

FIG. 5C is a block diagram of a user information field 525, according to an embodiment. Each of the user information fields 508 of FIG. 5A corresponds to the user information field 525, in an embodiment. The user information field 525 includes a plurality of subfields 530, including an association identifier (AID) subfield 530-1, a resource unit (RU) allocation subfield 530-2, a coding type subfield 530-3, a modulation and coding (MCS) subfield 530-4, a dual carrier modulation (DCM) subfield 530-5, a spatial stream (SS) allocation subfield 530-6, a target received single strength indication (RSSI) subfield 530-7, a reserved subfield 530-8 and a trigger dependent user information subfield 530-9, in an embodiment. FIG. 5C includes example numbers of bits of the subfields 530. In other embodiments, different suitable numbers of bits are utilized. Subfields 530 that do not have an associated number of bits in FIG. 5B are of a suitable length and/or a variable length. In some embodiments, one or more of the subfields 530 illustrated in FIG. 5C are omitted, and/or one or more additional subfields are included.

The AID subfield 530-1 includes an identifier, such as an association identifier or a partial association identifier, of the second communication device for which the user information field 525 is intended. In an embodiment, if the second communication device for which the user information field 525 is intended is an unassociated client station, the AID subfield 530-1 includes a pre-assigned association identifier (pre-AID) previously provided to the second communication device (e.g., station 154) by the first communication device (e.g., the AP 114). In an embodiment, if the second communication device for which the user information field 525 is intended is an unassociated client station and a pre-AID has not been assigned, then the AID subfield 530-1 includes a MAC address of the second communication device, such as a 6-octet MAC identifier or a portion thereof. In other embodiments, other suitable identifiers are utilized.

The RU allocation subfield 530-2 indicates a location and width of the sub-channel allocated to the second communication device identified in the AID subfield 530-2 for transmission of its NDP packet to the first communication device. The target RSSI subfield 530-7 indicates a target signal strength corresponding to the NDP packet when the NDP packet is received at the first communication device.

In an embodiment, one or more of the code type subfield 530-3, the MCS subfield 530-4, the DCM subfield 530-5 and the SS allocation subfield 530-6 are not needed in ranging measurement exchanges. Accordingly, in an embodiment, when the trigger type subfield 520-1 indicates that the trigger frame 500 is of a ranging measurement trigger variant, one or more of the code type subfield 530-3, the MCS subfield 530-4, the DCM subfield 530-5 and the SS allocation subfield 530-6 are reserved or omitted. Alternatively, one or more of the code type subfield 530-3, the MCS subfield 530-4, the DCM subfield 530-5 and the SS allocation subfield 530-6 are redefined to indicate other parameters, such as feedback codebook size, feedback Ng, feedback Nc, etc., in some embodiments.

The trigger dependent user information subfield 530-9 includes one or more indications of feedback type to be provided in the ranging measurement exchange by the second communication device identified in the AID subfield 530-2. For example, in an embodiment, the trigger dependent user information subfield 530-9 includes indications of whether or not one or more of AoD measurement, AoA measurement, ToD measurement, ToA measurement, etc., are to be provided in the feedback from the second communication device. In an embodiment, in addition to or instead of the trigger dependent user information subfield 530-9, the reserved subfield 530-1 is used to indicate feedback type. In an embodiment in which the reserved subfield 530-1 is used instead of the trigger dependent user information subfield 530-9, the trigger dependent user information subfield 530-9 itself is reserved or omitted.

Figure 6A:
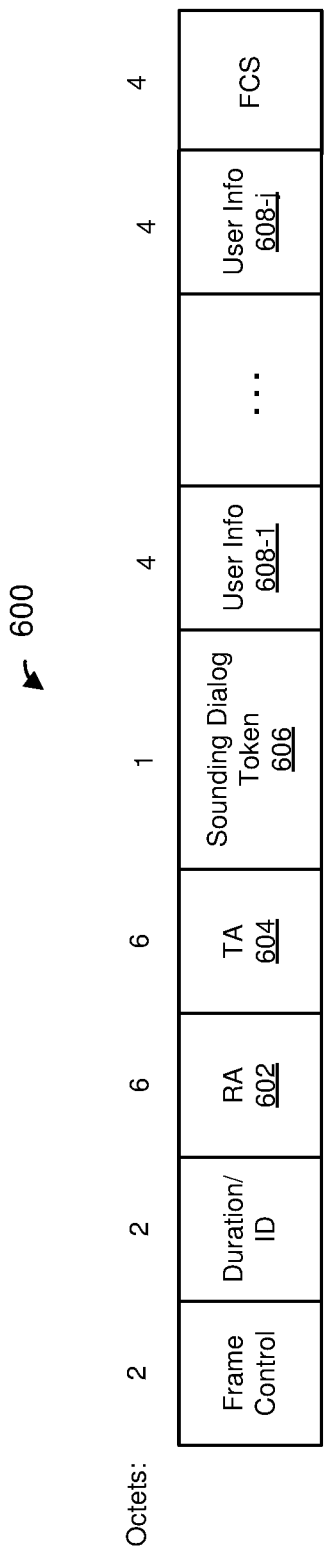
FIG. 6A is a diagram of an example non data packet announcement (NDPA) frame used in a ranging measurement exchange, according to an embodiment.

FIG. 6A is a diagram of an example NDPA frame 600, according to an embodiment. In an embodiment, the NDPA frame 600 is generated and transmitted by a first communication device (e.g., the AP 114) to prompt one or more second communication devices (e.g., client stations 154) to be prepared to receive an NDP from the first communication device. In an embodiment, the NDPA frame 600 corresponds to the NDPA frame included in the DL PPDU 228 of FIG. 2A. In another embodiment, the NDPA frame 600 corresponds to the NDPA frame included in the UL PPDU 316 and/or DL NDP 328 of FIG. 3A. In another embodiment, the NDPA frame 600 is used with suitable ranging measurement exchanges different from the ranging measurement exchange 200 of FIG. 2A or the ranging measurement exchange 300 of FIG. 3A. Similarly, the ranging measurement exchange 200 of FIG. 2A or the ranging measurement exchange 300 of FIG. 3A utilize NDPA frames different from the NDPA frame 600, in some embodiments.

FIG. 6A includes example numbers of octets of various fields of the NDPA frame 600. In other embodiments, different suitable numbers of octets and bits are utilized. Fields in FIG. 6A that do not have an associated number of octets/bits are of a suitable length and/or a variable length. In some embodiment, one or more of the fields illustrated in FIG. 6A are omitted and/or one or more additional fields not illustrated in FIG. 6A are included.

The NDPA frame 600 includes a receiver address (RA) field 602 to indicate an intended receiver of the NDPA frame 600. The RA field 602 can be set to a unicast address (e.g., a unicast MAC address) to specify a single communication device, a multicast address (e.g., a multicast MAC address) to specify a particular group of communication devices, or a broadcast address (e.g., a broadcast MAC address) to specify all communication devices, in some embodiments. The NDPA frame 600 also includes a transmitter address (TA) field 604 to indicate the transmitter of the NDPA frame 600. The TA field 604 can be set to a unicast address (e.g., a unicast MAC address) corresponding to the network interface 122 or the network interface 162, for example.

The NDPA frame 600 also includes a sounding token field 606. In an embodiment, the sounding token field 606 is used to indicate that the current frame exchange is for the purpose of ranging measurement, for example to distinguish the current frame exchange from a frame exchange for the purpose of channel measurement in a beamforming procedure. In an embodiment, a bit of the sounding token field 606 is set to a value of logic one (1) to indicate that the current frame change is for the purpose of ranging measurement. For example, bit 0 (B0) of the sounding token field 606 is set to a value of logic one (1) to indicate that the current frame change is for the purpose of ranging measurement. In another embodiment, another suitable bit of the sounding token field 606 is set to a value of logic one (1) to indicate that the current frame change is for the purpose of ranging measurement.

Figure 6B:
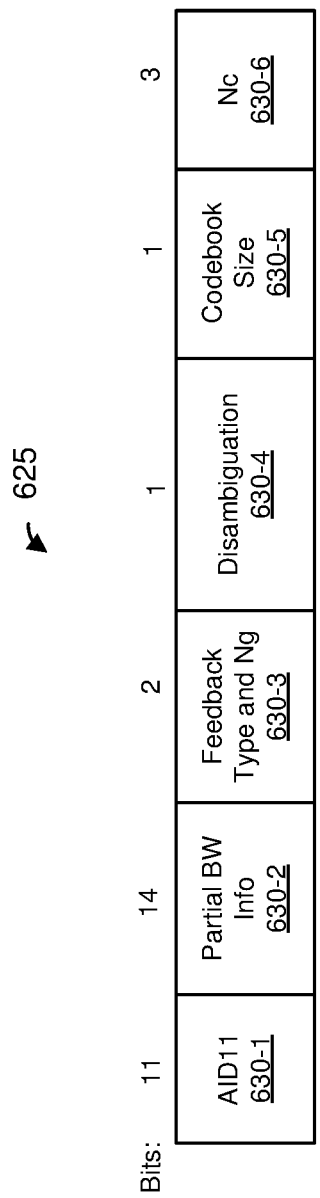
FIG. 6B is a block diagram of a user information field included in the NDPA frame of FIG. 6A, according to an embodiment.

The NDPA frame 600 further includes one or more user information fields 608 respectively corresponding to respective ones of the one or more second communication devices being prompted by the NDPA frame 600. FIG. 6B is a block diagram of a user information field 625, according to an embodiment. Each of the one or more user information fields 608 corresponds to user information field 625, according to an embodiment. The user information field 625 includes a plurality of subfields 630, including an association identifier (AID) subfield 630-1, a partial BW information subfield 630, a feedback type and Ng subfield 630-3, a disambiguation subfield 630-4, a codebook subfield 630-5, and an Nc subfield 630-6. FIG. 6B includes example numbers of bits of the subfields 630. In other embodiments, different suitable numbers of bits are utilized. In some embodiments, one or more of the subfields 630 illustrated in FIG. 6B are omitted, and/or one or more additional subfields not illustrated in FIG. 6B are included.

The AID subfield 630-1 includes an identifier, such as an association identifier or a partial association identifier, of the second communication device for which the user information field 625 is intended. In an embodiment, if the second communication device for which the user information field 625 is intended is an unassociated client station, the AID subfield 630-1 includes a pre-assigned association identifier (pre-AID) previously provided to the second communication device (e.g., station 154) by the first communication device (e.g., the AP 114). In an embodiment, if the second communication device for which the user information field 608 is intended is an unassociated client station and a pre-AID has not been assigned, then the AID subfield 630-1 includes a MAC address of the second communication device, such as a 6-octet MAC address or a portion thereof. In other embodiments, other suitable identifiers are utilized.

The disambiguation subfield 630-4 is set to indicate a communication protocol to which the current NDP sounding frame exchange conforms. For example, the disambiguation subfield 630-4 is set to a value (e.g., a logic one (1)) that indicates that the current NDP sounding frame exchange conforms to a first communication protocol (e.g., IEEE 802.11ax) and not a second communication protocol (e.g., IEEE 802.11ac).

One or more of the subfields 630 illustrated in FIG. 6B correspond to subfields of an NDPA frame used, for example, in a beamforming sounding procedure, and these one or more subfields 630 may be needed on the NDPA frame 600. The one or more subfields 630 that are not needed in the NDPA frame 600 are reserved in the NDPA frame 600, in an embodiment. For example, the partial BW information subfield 630-2 is reserved in the NDPA frame 600. In some embodiments, at least some of the one or more subfields 630 that are not needed in the NDPA frame 600 are omitted from the NDPA frame 600.

In an embodiment, to allow one or more second communication devices (e.g., client stations 154) to measure AoD based on NDPs (or regular PPDUs, in some embodiments) received from a first communication device (e.g., the AP 114), the first communication devices signals antenna information (e.g., number of antennas, distance between antennas, etc.) of the first communication device prior to transmission of the NDPs (or regular PPDUs, in some embodiments) to the second communication device. For example, the AP 114 includes antenna information in a beacon frame transmitted by the AP 114 or in a specifically designated management or action frame transmitted by the AP 114.

In some embodiments, to reduce overhead, the AP 114 includes antenna information in only some beacon frames transmitted by the AP 114, or transmits specifically designated management or action frames in only some beacon intervals. In an embodiment, each of one or more beacon frames consecutively transmitted by the AP 114 includes an antenna information element that indicates a number of beacon frames (e.g. including the current beacon frame) that will be transmitted before the AP 114 transmits a next beacon frame that includes antenna information (e.g., number of antennas, distance between antennas, etc.) of the AP 114, or before a next beacon interval during which the AP 114 will transmit a next specifically designated management or action frame that includes the antenna information of the AP 114. In another embodiment, each of one or more beacon frames consecutively transmitted by the AP 114 includes an antenna information element that indicates a target beacon transmission time of the next beacon frame that will include antenna information (e.g., number of antennas, distance between antennas, etc.) of the AP 114 or of a beginning of a next beacon interval during which the AP 114 will transmit a next specifically designated management or action frame that includes the antenna information of the AP 114.

Fig. of 7A is a diagram of an antenna information element 700 included in each of one or more consecutive beacon frames transmitted by the AP 114, according to an embodiment. The antenna information element 700 is a broadcast beacon element transmitted to all client stations 154, in an embodiment. FIG. 7A includes example numbers of octets of various fields of antenna information element 700. In other embodiments, different suitable numbers of octets and bits are utilized. In some embodiment, one or more of the fields illustrated in FIG. 7A are omitted and/or one or more additional fields not illustrated in FIG. 7A are included.

The antenna information element 700 includes an antenna information beacon count field 702. In an embodiment, the antenna information field 702 indicates a number of consecutive beacon frames that the AP 114 will transmit prior to transmission of a next beacon frame that includes an antenna information beacon element with antenna information (e.g., number of antennas, distance between antennas, etc.) of the AP 114. In another embodiment, the antenna information beacon count field 702 indicates a number of consecutive beacon frames that the AP 114 will transmit before a next beacon interval during which the AP 114 will transmit a next specifically designated management or action frame that includes the antenna information of the AP 114. In an embodiment, the count indicated in the antenna information beacon count field 702 includes the current beacon frame that includes the antenna information element 700. In another embodiment, the count indicated in the antenna information beacon count field 702 does not include the current beacon frame that includes the antenna information element 700. In an embodiment, a count of one (1) indicated in the antenna information beacon count field 702 indicates that the next beacon frame transmitted by the AP 114 will include a broadcast antenna information element that includes antenna information of the AP 114, or that the next beacon interval will include transmission of a next specifically designated management or action frame that includes the antenna information of the AP 114.

Fig. of 7A is a diagram of an antenna information element 700 included in each of one or more consecutive beacon frames transmitted by the AP 114, according to an embodiment. The antenna information element 700 is a broadcast beacon element transmitted to all client stations 154, in an embodiment. FIG. 7A includes example numbers of octets of various fields of antenna information element 700. In other embodiments, different suitable numbers of octets and bits are utilized. In some embodiment, one or more of the fields illustrated in FIG. 7A are omitted and/or one or more additional fields not illustrated in FIG. 7A are included.

The antenna information element 700 includes an antenna information beacon count field 702. In an embodiment, the antenna information field 702 indicates a number of consecutive beacon frames that the AP 114 will transmit prior to transmission of a next beacon frame that includes an antenna information beacon element with antenna information (e.g., number of antennas, distance between antennas, etc.) of the AP 114. In another embodiment, the antenna information beacon count field 702 indicates a number of consecutive beacon frames that the AP 114 will transmit before a next beacon interval during which the AP 114 will transmit a next specifically designated management or action frame that includes the antenna information of the AP 114. In an embodiment, the count indicated in the antenna information beacon count field 702 includes the current beacon frame that includes the antenna information element 700. In another embodiment, the count indicated in the antenna information beacon count field 702 does not include the current beacon frame that includes the antenna information element 700. In various embodiments, a count of one (1) indicated in the antenna information beacon count field 702 indicates that the next beacon frame transmitted by the AP 114 will include a broadcast antenna information element that includes antenna information of the AP 114, or that the next beacon interval will include transmission of a next specifically designated management or action frame that includes the antenna information of the AP 114.

Fig. of 7B is a diagram of an antenna information element 750 included in each of one or more consecutive beacon frames transmitted by the AP 114, according to another embodiment. The antenna information element 750 is a broadcast beacon element transmitted to all client stations 154, in an embodiment. FIG. 7B includes example numbers of octets of various fields of antenna information element 750. In other embodiments, different suitable numbers of octets and bits are utilized. In some embodiment, one or more of the fields illustrated in FIG. 7B are omitted and/or one or more additional fields not illustrated in FIG. 7B are included.

The antenna information element 750 is similar to the antenna information element 700 of FIG. 7A, except that in the antenna information element 750 the antenna information beacon count field 702 is replaced by an antenna information beacon timing synchronization function (TSF) field 752. The antenna information beacon TSF field 752 indicates target beacon transmission time (TBTT) of the next beacon frame that will include antenna information (e.g., number of antennas, distance between antennas, etc.) of the AP 114 or of a beginning of a next beacon interval during which the AP 114 will transmit a next specifically designated management or action frame that includes the antenna information of the AP 114, in various embodiments.

In some embodiments, one or more client stations 154 are configured to perform AoD measurements, without performing ToA or ToD measurements, In some such embodiments, the AP 114 transmits an NDPA/NDP transmission to the one or more client stations 154 as described above, and the one or more client stations 154 measure AoD based the NDP transmitted by the AP 114. In another embodiment, a client station 154 performs AoD measurement based on a regular PPDU (e.g., aggregated PPDU (A-PPDU)) transmitted by the AP 114 to the client station 154. Similarly, in an embodiment, the AP 114 performs AoA measurements based on an NDP that the AP 114 receives from a client station 154, or based on a regular PPDU (e.g, A-PPDU) that the AP 114 receives from a client station 154, in various embodiments.

FIG. 8 is a flow diagram of an example method 800 for performing ranging measurement in a wireless network, according to an embodiment. In some embodiments, the network interface device 122 of FIG. 1 is configured to implement the method 800. In some embodiments, the network interface device 162 of FIG. 1 is configured to implement the method 800. The method 800 is described in the context of the network interface device 122 and the network interface device 162 merely for explanatory purposes and, in other embodiments, the method 800 is implemented by other suitable devices.

At block 802, during an SP for a ranging measurement signal exchange between a first communication device and one or more second communication devices, the first communication device receives respective first NDPs from one or more second communication devices. The respective first NDPs omit data portions, in an embodiment. In an embodiment, the network interface device 122 of the AP 114 receives the NDPs 224 of FIGS. 2A-2B from a group of client stations 154. In another embodiment, the network interface device 162 receives the NDP 320 of FIGS. 3A-3B from the AP 114.

At block 804, during the SP, the first communication device transmits second NDPs to the one or more second communication devices. The respective second NDPs omit data portions, in an embodiment. In an embodiment, the network interface device 122 of the AP 114 transmits the NDPs 236 of FIGS. 2A-2B to the group of client stations 154. In another embodiment, the network interface device 162 transmits the NDP 328 FIGS. 3A-3B to the AP 114.

At block 806, during the SP, the first communication device transmits respective first ranging measurement feedback packets to the one or more second communication devices. In an embodiment, the respective first ranging measurement feedback packet transmitted at block 806 to a particular second communication device includes at least a) an indication corresponding to a time $t_2$ at which the respective first NDP was received from the particular second communication device and b) an indication corresponding to a time $t_3$ at which the respective second NDP was transmitted to the particular second communication device to allow the particular second communication device to determine a time-of-flight between the first communication device and the particular second communication device.

At block 808, during the SP, the first communication device receives respective second ranging measurement feedback packets from the one or more second communication devices. In an embodiment, the respective second ranging measurement feedback packet from a particular second communication device includes at least a) an indication corresponding to a time $t_1$ at which the respective first NDP was transmitted by the particular second communication device, and b) an indication corresponding to a time $t_4$ at which the respective second NDP was received by the particular second communication device to allow the first communication device to determine a time-of-flight between the first communication device and the particular second communication device.

In some embodiments, the method 900 omits the block 806 or the block 808. In such embodiments, ranging measurement feedback is not provided either i) from the first communication device to the one or more second communication devices (e.g., if the block 806 is omitted) or ii) from the one or more second communication devices to the first communication device (e.g., if the block 808 is omitted). In another embodiment, the method 900 includes both the block 806 and the block 808. In such embodiments, ranging measurement feedback is provided both i) from the first communication device to the one or more second communication devices (e.g., if the block 806 is omitted) and ii) from the one or more second communication devices to the first communication device.

In an embodiment, a method for performing ranging measurements in a wireless network comprises receiving, at a first communication device during a service period (SP) for a ranging measurement signal exchange between the first communication device and one or more second communication devices, respective first null data packets (NDPs) from the one or more second communication devices, the respective first NDPs omitting data portions; transmitting, from the first communication device during the SP, respective second NDPs to the one or more second communication devices, the respective second NDPs omitting data portions; and one or both of i) transmitting, from the first communication device during the SP, respective first ranging measurement report packets to the one or more second communication devices, the respective first ranging measurement feedback packet transmitted to a particular second communication device including at least a) an indication corresponding to a time $t_2$ at which the respective first NDP was received from the particular second communication device and b) an indication corresponding to a time $t_3$ at which the respective second NDP was transmitted to the particular second communication device to allow the particular second communication device to determine a time-of-flight between the first communication device and the particular second communication device, and ii) receiving, at the first communication device during the SP, respective second ranging measurement report packets from the one or more second communication devices, the respective second ranging measurement report packet from a particular second communication device including at least a) an indication corresponding to a time $t_1$ at which the respective first NDP was transmitted by the particular second communication device, and b) an indication corresponding to a time $t_4$ at which the respective second NDP was received by the particular second communication device to allow the first communication device to determine a time-of-flight between the first communication device and the particular second communication device.

In other embodiments, the method includes one of, or any suitable combination of two or more of, the following features.

The method further includes generating, at the first communication device, an NDP announcement (NDPA) frame to announce transmission of the respective second NDPs to the one or more second communication devices; and prior to transmitting the respective second NDPs from the first communication device to the one or more second communication devices, transmitting, from the first communication device, the NDPA frame to the one or more second communication devices.

Generating the NDPA frame comprises generating the NDPA frame to include a sounding dialog token field to indicate that the NDPA frame is for ranging measurement and not for channel sounding in a beamforming procedure.

Generating the NDPA frame comprises generating the NDPA frame to include a disambiguation field set to indicate that the NDPA frame conforms to a first communication protocol and does not conform to a second communication protocol different from the first communication protocol.

The one or more second communication devices comprise multiple second communication devices.

The method further includes generating, at the first communication device, a trigger frame to be transmitted to the multiple second communication devices; and prior to receiving the respective first NDPs at the first communication device, transmitting the trigger frame from the first communication device to the multiple second communication devices to cause simultaneous transmission of the respective first NDPs by the multiple second communication devices.

Generating the trigger frame comprises generating the trigger frame to include a cascade indication field set to indicate that at least one additional ranging measurement between the first communication device and the second communication device is to follow the current ranging measurement.

The one or more second communication devices comprise a single second communication device.

The method further includes prior to receiving the first NDP from the single second communication device, receiving an NDPA frame from the single second communication frame, the NDPA frame announcing transmission of the first NDP from the second communication device to the first communication device.

The method further comprises transmitting, at a beginning of the SP, a polling data unit to the one or more second communication devices to prompt the one or more second communication devices to be ready for transmission of the respective first NDPs to the first communication device.

The method comprises both i) transmitting the respective first ranging measurement feedback packets to the one or more second communication device and ii) receiving the respective second ranging measurement feedback packets from the one or more second communication devices.

The respective second ranging measurement feedback packets are transmitted by the one or more second communication devices a predetermined time interval after reception of the respective first ranging measurement feedback packets by the one or more second communication devices.

The predetermined time interval corresponds to a short interframe space (SIFS) time period.

In another embodiment, an apparatus comprises a network interface device associated with a first communication device. The network interface device includes one or more integrated circuits (ICs) configured to: receive, during a service period (SP) for a ranging measurement signal exchange between the first communication device and one or more second communication devices, respective first null data packets (NDPs) from respective one or more second communication devices; transmit, during the SP, respective second NDPs to the respective one or more second communication devices; and one or both of i) transmit, during the SP, respective first ranging measurement report packets to the one or more second communication devices, the respective first ranging measurement feedback packet transmitted to a particular second communication device including at least a) an indication corresponding to a time $t_2$ at which the respective first NDP was received from the particular second communication device and b) an indication corresponding to a time $t_3$ at which the respective second NDP was transmitted to the particular second communication device to allow the particular second communication device to determine a time-of-flight between the first communication device and the particular second communication device, and ii) receive, during the SP, respective second ranging measurement feedback packets from the one or more second communication devices, the respective second ranging measurement feedback packet from a particular second communication device including at least a) an indication corresponding to a time $t_1$ at which the respective first NDP was transmitted by the particular second communication device, and b) an indication corresponding to a time $t_4$ at which the respective second NDP was received by the particular second communication device to allow the first communication device to determine a time-of-flight between the first communication device and the particular second communication device.

In other embodiments, the apparatus comprises one of, or any suitable combination of two or more of, the following features.

The one or more ICs are further configured to: generate an NDP announcement (NDPA) frame to announce transmission of the respective second NDPs to the one or more second communication devices; and prior to transmitting the respective second NDPs to the one or more second communication devices, transmit the NDPA frame to the one or more second communication devices.

The one or more ICs are configured to generate the NDPA frame to include a sounding dialog token field to indicate that the NDPA frame is for ranging measurement and not for channel sounding in a beamforming procedure.

The one or more ICs are configured to generate the NDPA frame to include a disambiguation field set to indicate that the NDPA frame conforms to a first communication protocol and does not conform to a second communication protocol different from the first communication protocol.

The one or more second communication devices comprise multiple second communication devices.

The one or more ICs are further configured to: generate a trigger frame to be transmitted to the multiple second communication devices; and prior to receiving the respective first NDPs at the first communication device, transmit the trigger frame to the multiple second communication devices to cause simultaneous transmission of the respective first NDPs by the multiple second communication devices.

The one or more ICs are configured to generate the trigger frame to include a cascade indication field set to indicate that at least one additional ranging measurement between the first communication device and the second communication device is to follow the current ranging measurement.

The one or more second communication devices comprise a single second communication device.

The one or more ICs are further configured to, prior to receiving the first NDP from the single second communication device, receive an NDPA frame from the single second communication frame, the NDPA frame announcing transmission of the first NDP from the second communication device to the first communication device.

The one or more ICs are further configured to, at a beginning of the SP, transmit a polling data unit to the one or more second communication devices to prompt the one or more second communication devices to be ready to transmit the respective first NDPs to the first communication device.

The one or more ICs are configured to, during the SP, both i) transmit the respective first ranging measurement feedback packets to the one or more second communication device and ii) receive the respective second ranging measurement feedback packets from the one or more second communication devices.

The respective second ranging measurement feedback packets are transmitted by the one or more second communication devices a predetermined time interval after reception of the respective first ranging measurement feedback packets by the one or more second communication devices.

The predetermined time interval corresponds to a short interframe space (SIFS) time period.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing ranging measurements in a wireless network, the method comprising:
   receiving, at a first communication device during a service period (SP) for a ranging measurement signal exchange between the first communication device and one or more second communication devices, respective first null data packets (NDPs) from the one or more second communication devices, the respective first NDPs omitting data portions;
   transmitting, from the first communication device during the SP, respective second NDPs to the one or more second communication devices after the reception of the respective first NDPs, the respective second NDPs omitting data portions; and
   one or both of
      i) transmitting, from the first communication device during the SP, respective first ranging measurement feedback packets to the one or more second communication devices, the respective first ranging measurement feedback packet transmitted to a particular second communication device including at least a) an indication corresponding to a time $t_2$ at which the respective first NDP was received from the particular second communication device and b) an indication corresponding to a time $t_3$ at which the respective second NDP was transmitted to the particular second communication device to allow the particular second communication device to determine a time-of-flight between the first communication device and the particular second communication device, and
      ii) receiving, at the first communication device during the SP, respective second ranging measurement feedback packets from the one or more second communication devices, the respective second ranging measurement feedback packet from a particular second communication device including at least a) an indication corresponding to a time $t_1$ at which the respective first NDP was transmitted by the particular second communication device, and b) an indication corresponding to a time $t_4$ at which the respective second NDP was received by the particular second communication device to allow the first communication device to determine a time-of-flight between the first communication device and the particular second communication device;
   transmitting, by the first communication device at a beginning of the SP, a polling data unit to the one or more second communication devices to prompt the one or more second communication devices to be ready to transmit the respective first NDPs to the first communication device and to transmit respective poll response frames to the first communication device a short interframe space (SIFS) time period after reception of the polling data unit;
   transmitting, from the first communication device, a trigger frame to the one or more second communication devices a SIFS time period after reception of the respective poll response frames to cause simultaneous transmission of the respective first NDPs, wherein the respective first NDPs are transmitted by the one or more second communication devices a SIFS time period after reception of the trigger frame; and transmitting the respective first ranging measurement feedback packets to the one or more second communication devices, wherein transmitting the respective first ranging measurement feedback packets comprises transmitting the respective first ranging measurement feedback packets a SIFS time period after transmitting the respective second NDPs.

2. The method of claim 1, further comprising generating, at the first communication device, an NDP announcement (NDPA) frame to announce transmission of the respective second NDPs to the one or more second communication devices, and prior to transmitting the respective second NDPs from the first communication device to the one or more second communication devices, transmitting, from the first communication device, the NDPA frame to the one or more second communication devices a SIFS time period after reception of the first NDPs;

wherein transmitting the respective second NDPs comprises transmitting the respective second NDPs a SIFS time period after transmitting the NDPA frame.

3. The method of claim 2, wherein generating the NDPA frame comprises generating the NDPA frame to include a sounding dialog token field to indicate that the NDPA frame is for ranging measurement and not for channel sounding in a beamforming procedure.

4. The method of claim 2, wherein generating the NDPA frame comprises generating the NDPA frame to include a disambiguation field set to indicate that the NDPA frame conforms to a first communication protocol and does not conform to a second communication protocol different from the first communication protocol.

5. The method of claim 1, wherein the one or more second communication devices comprise a single second communication device, and the method further comprises, prior to receiving the first NDP from the single second communication device, receiving an NDPA frame from the single second communication frame, the NDPA frame announcing transmission of the first NDP from the second communication device to the first communication device.

6. The method of claim 1, wherein the method comprises both i) transmitting the respective first ranging measurement feedback packets to the one or more second communication device and ii) receiving the respective second ranging measurement feedback packets from the one or more second communication devices, wherein the respective second ranging measurement feedback packets are transmitted by the one or more second communication devices a predetermined time interval after reception of the respective first ranging measurement feedback packets by the one or more second communication devices.

7. The method of claim 6, wherein the predetermined time interval corresponds to a short interframe space (SIFS) time period.

8. The method of claim 1, wherein the transmissions of the polling data unit, the poll response frames, the trigger frame, the first NDPs, the second NDPs, and the first ranging measurement feedback packets occur during a same transmission opportunity (TXOP).

9. An apparatus, comprising:

a network interface device associated with a first communication device, wherein the network interface device includes one or more integrated circuits (ICs) configured to:

receive, during a service period (SP) for a ranging measurement signal exchange between the first communication device and one or more second communication devices, respective first null data packets (NDPs) from respective one or more second communication devices, transmit, during the SP, respective second NDPs to the respective one or more second communication devices after the reception of the respective first NDPs, and one or both of i) transmit, during the SP, respective first ranging measurement feedback packets to the one or more second communication devices, the respective first ranging measurement feedback packet transmitted to a particular second communication device including at least a) an indication corresponding to a time $t_2$ at which the respective first NDP was received from the particular second communication device and b) an indication corresponding to a time $t_3$ at which the respective second NDP was transmitted to the particular second communication device to allow the particular second communication device to determine a time-of-flight between the first communication device and the particular second communication device, and ii) receive, during the SP, respective second ranging measurement feedback packets from the one or more second communication devices, the respective second ranging measurement feedback packet from a particular second communication device including at least a) an indication corresponding to a time $t_1$ at which the respective first NDP was transmitted by the particular second communication device, and b) an indication corresponding to a time $t_4$ at which the respective second NDP was received by the particular second communication device to allow the first communication device to determine a time-of-flight between the first communication device and the particular second communication device; and wherein the one or more ICs are further configured to, at a beginning of the SP:

transmit a polling data unit to the one or more second communication devices to prompt the one or more second communication devices to be ready to transmit the respective first NDPs to the first communication device and to transmit respective poll response frames to the first communication device a short interframe space (S IFS) time period after reception of the polling data unit;

transmit a trigger frame to the one or more second communication devices a SIFS time period after reception of the respective poll response frames to cause simultaneous transmission of the respective first NDPs, wherein the respective first NDPs are transmitted by the one or more second communication devices a SIFS time period after reception of the trigger frame; and transmit the respective first ranging measurement feedback packets to the one or more second communication devices, wherein transmitting the respective first ranging measurement feedback packets comprises transmitting the respective first ranging measurement feedback packets a SIFS time period after transmitting the respective second NDPs.

10. The apparatus of claim 9, wherein the one or more ICs are further configured to
generate an NDP announcement (NDPA) frame to announce transmission of the respective second NDPs to the one or more second communication devices,
prior to transmitting the respective second NDPs to the one or more second communication devices, transmit the NDPA frame to the one or more second communication devices a SIFS time period after reception of the first NDPs, and
transmit the respective second NDPs a SIFS time period after transmitting the NDPA frame.

11. The apparatus of claim 10, wherein the one or more ICs are configured to generate the NDPA frame to include a sounding dialog token field to indicate that the NDPA frame is for ranging measurement and not for channel sounding in a beamforming procedure.

12. The apparatus of claim 10, wherein the one or more ICs are configured to generate the NDPA frame to include a disambiguation field set to indicate that the NDPA frame conforms to a first communication protocol and does not conform to a second communication protocol different from the first communication protocol.

13. The apparatus of claim 9, wherein
the one or more second communication devices comprise a single second communication device, and
the one or more ICs are further configured to, prior to receiving the first NDP from the single second communication device, receive an NDPA frame from the single second communication frame, the NDPA frame announcing transmission of the first NDP from the second communication device to the first communication device.

14. The apparatus of claim 9, wherein the one or more ICs are configured to, during the SP, both i) transmit the respective first ranging measurement feedback packets to the one or more second communication device and ii) receive the respective second ranging measurement feedback packets from the one or more second communication devices, wherein the respective second ranging measurement feedback packets are transmitted by the one or more second communication devices a predetermined time interval after reception of the respective first ranging measurement feedback packets by the one or more second communication devices.

15. The apparatus of claim 14, wherein the predetermined time interval corresponds to a short interframe space (SIFS) time period.

* * * * *